US008234564B2

(12) United States Patent
Drieu et al.

(10) Patent No.: US 8,234,564 B2
(45) Date of Patent: Jul. 31, 2012

(54) TRANSFORMS AND ANIMATIONS OF WEB-BASED CONTENT

(75) Inventors: Gilles Drieu, San Francisco, CA (US); Simon Fraser, Sunnyvale, CA (US); Chris Marrin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 520 days.

(21) Appl. No.: 12/397,325

(22) Filed: Mar. 3, 2009

(65) Prior Publication Data

US 2009/0228784 A1      Sep. 10, 2009

Related U.S. Application Data

(60) Provisional application No. 61/033,765, filed on Mar. 4, 2008.

(51) Int. Cl.
*G06F 17/00*        (2006.01)
(52) U.S. Cl. .................. 715/235; 715/234; 715/236
(58) Field of Classification Search .............. 382/285, 382/295, 296, 298; 715/234, 235, 236
See application file for complete search history.

(56) References Cited

U.S. PATENT DOCUMENTS

| | | | |
|---|---|---|---|
| 7,383,512 B1* | 6/2008 | Martinsen et al. | 715/749 |
| 2001/0010517 A1* | 8/2001 | Iimura et al. | 345/426 |
| 2005/0038796 A1* | 2/2005 | Carlson et al. | 707/100 |
| 2005/0131930 A1* | 6/2005 | Jang et al. | 707/101 |
| 2006/0005114 A1* | 1/2006 | Williamson et al. | 715/502 |
| 2006/0214935 A1* | 9/2006 | Boyd et al. | 345/473 |
| 2008/0094401 A1* | 4/2008 | Lee et al. | 345/473 |
| 2008/0120538 A1* | 5/2008 | Kurz et al. | 715/255 |
| 2008/0303828 A1* | 12/2008 | Marchant et al. | 345/473 |

OTHER PUBLICATIONS

Vermeulen, Milo; "Integrating JavaScript into Stylesheets"; Jan. 15, 2007; milov.nl. Retrieved from http://milov.nl/2389.*
Microsoft Corporation, Microsoft Computer Dictionary, 2002, Microsoft Press, Fifth Edition, p. 328.*
Ikk et al, "DevMaster.net Forums—How to flatten view?", Nov. 7, 2005, DevMaster.net. Retrieved from http://www.devmaster.net/forums/printthread.php?t=4224.*
Musciano, Chuck; "The dynamic, powerful abilities of JavaScript Style Sheets" in SunWorld, Apr. 1997. Originally published at http://www.sunworld.com/swol-04-1997/swol-04-webmaster.html and retrieved from http://sunsite.uakom.sk/sunworldonline/swol-04-1997/swol-04-webmaster.html.*
Jagminas, Villius; Prototyping a simple 3D renderer with javascript Tutorial, part 1; Mar. 17, 2004. Originally available at http://hem.spray.se/vilius/js3Dtutor.html and retrieved from http://web.archive.org/web/20040317173230/http://hem.spray.se/vilius/js3Dtutor.html.*
Carlbom and Paciorek, "Planar Geometric Projections and Viewing Transformations" in Computing Surveys, Dec. 1978, ACM, vol. 10 No. 4, pp. 465-502.*

(Continued)

*Primary Examiner* — Chau Nguyen
(74) *Attorney, Agent, or Firm* — Blakely, Sokoloff, Taylor & Zafman LLP

(57) ABSTRACT

Embodiments of the present invention provide a way to perform transforms and animations using Cascading Style Sheets (CSS). CSS may be used to define colors, fonts, layout, and other aspects of document presentation, such as for a webpage. Embodiments of the present invention provide CSS properties for transforms and animations of document content. New CSS properties for transforms allow for rotation, translation, scaling, skewing, perspective, origin, and the like. CSS properties are also provided for animating document content, such as movement, transitions, and the like.

28 Claims, 17 Drawing Sheets

OTHER PUBLICATIONS

Duce et al, "Web 2D Graphics File Formats" in Computer Graphics forum, 2002, Eurographics Association and Blackwell Publishers Ltd., vol. 21 No. 1, pp. 43-65.*

Clay et al, [css] meer css met htc voor ie, Nov. 2, 2004, Gathering of Tweakers. Retrieved from http://gathering.tweakers.net/forum/list_messages/831654.*

Hyatt, Dave et al; CSS Transforms; Apr. 4, 2008. Originally available at http://webkit.org/specs/CSSVisualEffects/CSSTransforms.html and retrieved from http://web.archive.org/20080414045803/http://webkit.org/specs/CSSVisualEffects/CSSTransforms.html.*

Jagminas, Villius; shapes1.js—A Javascript library to construct primitive wireframe shapes; Oct. 15, 2003; Version 0.1. Retrieved from http://hem.spray.se/vilius/js3Dengine/shapes1.js.*

No Author, matrix.js, Dec. 5, 2006. Originally available at http://hem.spray.se/vilius/js3Dengine/matrix.js and retrieved from http://web.archive.org/web/20061205225129/http://hem.spray.se/vilius/js3D-engine/matrix.js.*

Zorn, Walter; DHTML, JavaScript Draw Line, Circle, Ellipse (Oval), Polyline, Polygon, Rectangle.; Jan. 2, 2007. Originally available at http://walterzorn.com/jsgraphics/jsgraphics_e.htm and retrieved from http://web.archive.org/20070102145644/http://walterzorn.com/jsgraphics/jsgraphics_e.htm.*

Zorn, Walter; wz_jsgraphics.js; Jun. 21, 2006; Version 2.36. Originally available at http://walterzorn.com/scripts/wz_jsgraphics.zip and retrieved from http://web.archive.org/web/20070102145644/http://walterzorn.com/scripts/wz_jsgraphics.zip.*

Barbara Harper, "Computer Animation", Nov. 28, 1999, the University of Texas at Austin, pp. 1-12.*

* cited by examiner

-webkit-transform: scale (2);   Scale

-webkit-transform: scaleX (2);   Scale

-webkit-transform: scaleY (2);   Scale

-webkit-transform = rotate (30deg);  Rotate

-webkit-transform = rotate (90deg);  Rotate 0 seconds — Opacity = 1 (1110)

0.25 seconds — Opacity = 0.75 (1120)

0.5 seconds — Opacity = 0.5 (1130)

0.75 seconds — Opacity = 0.25 (1140)

Bézier curves

Bézier ease out

Bézier ease in-out

TRANSFORMS AND ANIMATIONS OF WEB-BASED CONTENT

This application claims priority to U.S. Provisional Application No. 61/033,765 filed on Mar. 4, 2008, which provisional application is incorporated herein by reference in its entirety.

FIELD

This invention is related to transformations and animations of objects in web-based content.

DESCRIPTION OF THE RELATED TECHNOLOGY

Cascading Style Sheets (CSS) is a well-known stylesheet language used to describe presentation of a document written in a markup language, such as HTML, XML, and XHTML, for example. CSS may be designed primarily to separate document content (typically written in a markup language) from document presentation (written in CSS). This separation between the document content and the document's presentation can allow for improved content accessibility, more flexibility and control in the specification and presentation characteristics, and reduced complexity and repetition in structural content. CSS standardized specifications are maintained by the World Wide Web Consortium (W3C).

To parse documents including CSS, HTML, and other technologies, a document rendering model, or layout engine may be needed. These layout engines parse the document content and document presentation to be displayed to the user. One such layout engine may be Apple's WebKit, which may be an open source application framework that parses CSS, HTML, and other technologies quickly and efficiently.

Increasingly, CSS documents must be able to provide users a richer, dynamic, and interactive experience on and off the Internet. As such, various technologies have emerged to provide simple animations and transforms of various objects within a given document's content. One prevalent technology today is Adobe Systems' Flash technology, which may be used by content creators to provide a rich and vivid experience on the Internet. In creating Flash-based content, content creators often have to develop the Flash-based content in a separate program, and then embed the Flash-based content in the document. This developmental separation between the Flash-based content and the document content itself often means that two developmental platforms are needed to create document content for a single document in order to provide simple animation and transforms. With improved support for Cascading Style Sheets (CSS) in web browsers, web developers have been able to make use of CSS to control presentation of documents written in hypertext markup language (HTML) independently of its content. Each content element within a web page may be assigned a set of stylistic rules that dictates presentation of that element. In this manner, markup pages can be presented in different styles. CSS further provides priority schemes that determine which style rules are applied if more than one rule matches a particular content element. This behavior may be referred to as cascade and makes use of weights that are calculated and assigned to rules to provide predictable outcomes. CSS styles can be provided in separate documents or embedded in markup documents. Style sheets can be imported and alternative style sheets specified for user selection. CSS provides various facilities to control both the appearance of single elements on web pages, for example their size and background color, and how various different elements on pages may be presented visually with respect to each other. For example, properties may be provided that control back-to-front ordering of different elements, and whether elements "clip" elements inside of it. These rendering behaviors may be described by Cascading Style Sheets specifications.

In order to create a single cohesive platform to provide static and animated objects within a given document, Scalable Vector Graphics (SVG) has been developed. SVG may be an XML specification and file format for describing two-dimensional vector graphics. Using SVG allows content developers to provide an interactive and animated experience for a user using a single authoritative platform in which to create both the document content and document presentation when used in conjunction with XML/XHTML and often CSS. However, SVG-based content typically relies on a document content to be written in XML or XHTML, or some combination thereof, in order for the content to be displayed properly to a user. Thus, many old and new document contents that rely on HTML and CSS need to be completely rewritten in order to display SVG-based content.

Other limitations exist for both platforms. Flash-based content suffers from not being truly three-dimensional. Flash often uses the notion of perceived three-dimensional content to create animations and perspective. Using SVG also has the downfall of not being fully supported by many document rendering models despite being an open standard by the W3C. In not being fully supported by many document-rendering models, a document's content may not even be displayed to a user. A simply empty void space with a red "x" may just mark the spot where the SVG content should have been displayed. Furthermore, Flash may be generally very computer processor intensive in nature and may reduce battery life on mobile devices significantly.

DETAILED DESCRIPTION

Figure 1A:
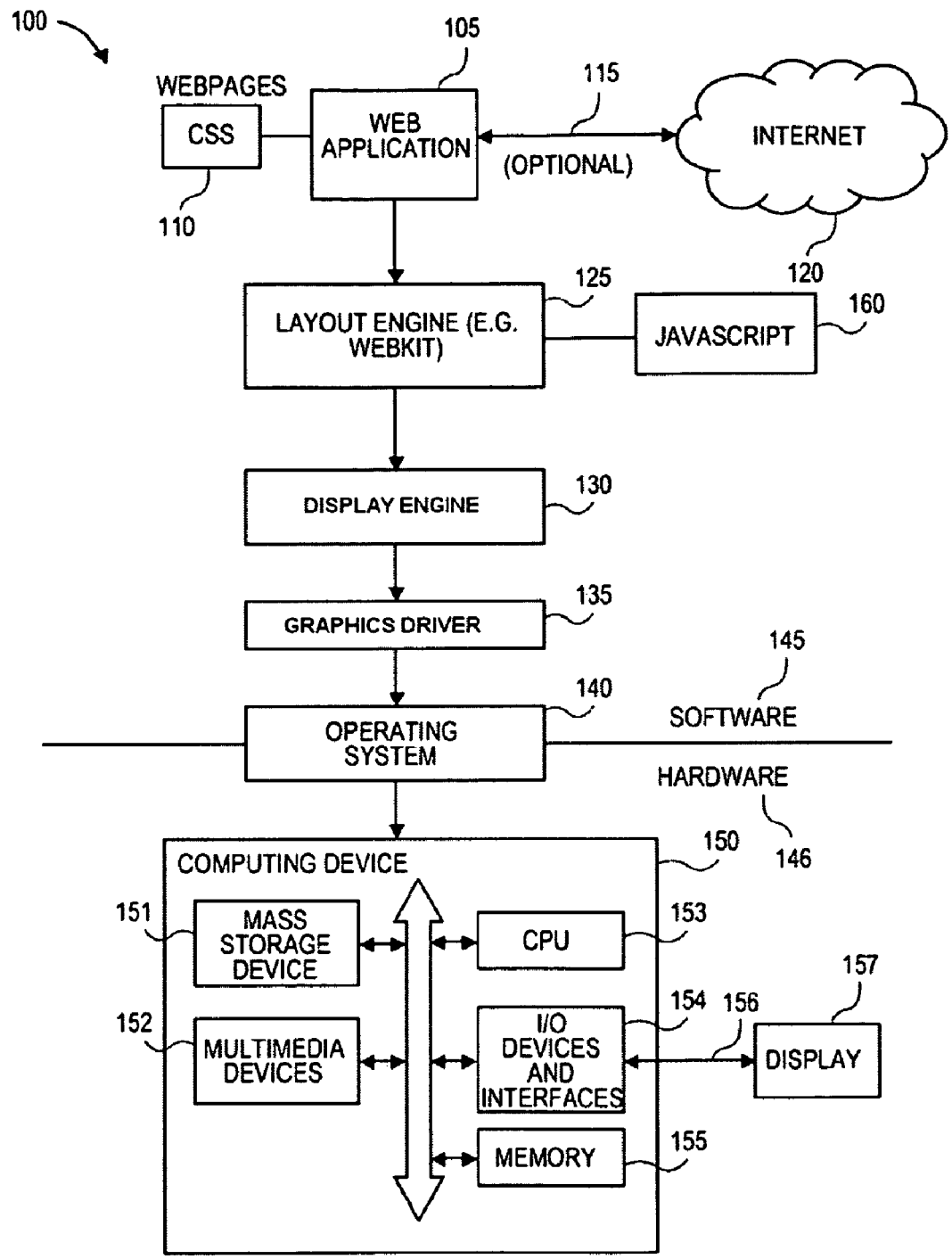
FIG. 1A is a block diagram of a software and hardware level to render a web application.

Embodiments of the present invention provide a way to perform transforms and animations using Cascading Style Sheets (CSS). As noted, CSS may be used to define colors, fonts, layout, and other aspects of document presentation, such as for a webpage. Embodiments of the present invention provide CSS properties for transforms and animations of document content. For example, new CSS properties for transforms may allow for rotation, translation, scaling, skewing, perspective, origin, and the like. CSS properties may also be provided for animating document content, such as movement, transitions, and the like.

Embodiments of the invention will now be described with reference to the accompanying Figures, wherein like numerals refer to like elements throughout. The terminology used in the description presented herein is not intended to be interpreted in any limited or restrictive manner, simply because it may be being utilized in conjunction with a detailed description of certain specific embodiments of the invention. Furthermore, embodiments of the invention may include several novel features, no single one of which may be solely responsible for its desirable attributes or which may be essential to practicing the inventions herein described.

Document content may refer to any content of any document. For example, document content may include text, images, video/animation/audio, and/or any other content. Exemplary text may include text written in any number of markup languages, such as HTML, XML, XHTML, XML User Interface Language (XUL), Standard Generalized Markup Language (SGML), eXtensible Stylesheet Language (XSL), or any number of text formats, such as .TXT. Exemplary images may include file formats, such as .JPG, .GIF, .TIFF, .BMP, .PNG, .PSD, for example. Exemplary video/animation/audio may include file formats, such as .MOV, .WMV, .AVI, .MP3, .MP4, .SWF, .M4V, for example.

Document presentation may refer to any presentation of a document. For example, document presentation may define colors, fonts, and layout of a particular document, and may be written in any number of markup languages, such as CSS, Document Style Semantics and Specification Language (DSSSL), Extensible Stylesheet Language (XSL), JavaScript Style Sheets (jSSS), and/or Formatted Output Specification Instance (FOSI). Depending on the embodiment, the document content and document presentation may be in the same or different files.

Web content may refer to any document that can be accessed via the Internet or off the Internet on any number of computing devices. These documents may reside on a networked server or be local to a device. In one embodiment, these documents may include document content and/or a document presentation. It may be appreciated that a web application may include one or more webpages.

A transform may refer to any transformational properties of an object in a webpage or web application. Exemplary transformational properties may include a three-dimensional look, rotation, translation, scaling, skewing, perspective, origin, and style. Exemplary properties of these transformational properties will be further explained below.

Animation may refer to any animated quality, liveliness, vivacity, and/or spirit of an object in a webpage or web application. Exemplary animation properties may include moving, jumping, rotating, or any other animated quality. The term animation may include opacity changes, duration of the animation, and any timing functions for the animation.

FIG. 1A is a block diagram of computing system 100 including computing device 150 in communication with web application 105. Computing system 100 may be used to implement certain systems and methods described herein. Depending on the embodiment, the functionality described below with reference to certain components and modules of computing system 100 may be combined into fewer components and modules or further separated into additional components or modules. In one embodiment, web application 105 may be accessed and manipulated via a network, such as Internet 120 using communication link 115. In another embodiment, web application 105 may be local to computing device 150.

On software level 145, as mentioned above, web application 105 may include document content and document presentation, such as CSS 110, that may be rendered using layout engine 125. Web application 105 may include various webpages that include transforms and animations of various objects in the document content. For example, web application 105 may get stock quotes from the Internet or web application 105 may be a networked/non-networked game, for example. In one embodiment, web application 105 may be run in a browser, such as Apple's Safari, Mozilla's Firefox, or Microsoft's Internet Explorer, for example. In another embodiment, web application 105 may be run external to a browser using any number of layout engines.

CSS 110 may provide a document presentation description for web application 105.

Layout engine 125, such as WebKit, may include an application framework used to render web pages or web application. As mention above, these web pages or web application may include document content and document presentation. Furthermore, layout engine 125 may include a scripting framework, such as JavaScript, to specify various scripting parameters for the document content and/or document presentation.

A scripting framework, such as JavaScript 160 may be used in conjunction with CSS 110 to render web application 105. Further details of JavaScript 160 will be explained below.

Display engine 130 may be used by layout engine 125 to help render certain aspects, such as animations, of the document content and document presentation of web application 105. Display engine 130 may be implemented as Core Animation software from Apple Computer Inc. Display engine 130 may be a data visualization API and framework used by Apple's Mac OS X 10.5 to produce animated user interfaces. Display engine 130 may provide a way for developers to produce animated user interfaces via an implicit animation model. A developer using display engine 130 may only specify original and final states of an object in a webpage or web application 105, and display engine 130 handles transitions between the original and final states of the object. In one embodiment, display engine 130 may allow animated interfaces to be created with relative ease, as no specific code for the animation may be required by the developer.

Graphics driver 135 may be used by display engine 130 to help render any animations in web application 105. Graphics driver 135 may be implemented based on Open Graphics Library (OpenGL), which may be a standard specification defining a cross-language cross-platform API for writing applications that produce 2D and 3D computer graphics. Graphics driver 135 can be used to draw complex three-dimensional scenes from simple primitive shapes or models. Other hardware or software acceleration may be used to help render any animations in web application 105.

Operating system (OS) layer 140 may control graphics driver 135 and other aspects of web application 105 and computing device 150. Operating system layer 140 may include Mac OS X, Linux, Windows, or any number of operating systems. Conventional operating systems control and schedule computer processes for execution, perform memory management, provide file system, networking, and I/O services, and provide a user interface, such as a graphical user interface (GUI), among other things.

In an exemplary embodiment, a computing device receives a webpage (including a document content and a document presentation with moving objects), and using layout engine 125 and/or display engine 130 and/or graphics driver 140, renders the webpage to be displayed on a visual display. In one embodiment, the webpage or information about the webpage may be stored on the computing device in a cache storage. The cache storage may be used for temporary or permanent storage of various files for the webpage.

On hardware level 146, computing device 150 can include memory 155, such as random access memory (RAM) for temporary storage of information and read only memory (ROM) for permanent storage of information, and mass storage device 151, such as a hard drive, diskette, or optical media storage device. Mass storage device 151 may include one or more machine readable storage media, such as a hard disk drive, optical drive, networked drive, or some combination of various digital storage systems. Computing device 150 can also include a central processing unit (CPU) 153 for computation. Typically, the modules of computing device 150 are in data communication via one or more standards-based bus system. In different embodiments, the standards based bus system could be Peripheral Component Interconnect (PCI), Microchannel, SCSI, Industrial Standard Architecture (ISA) and Extended ISA (EISA) architectures, for example.

Exemplary computing device 150 may include one or more of commonly available input/output (I/O) devices and interfaces 154, such as a keyboard, mouse, touchpad, and printer and be coupled through connection 156. In one embodiment, I/O devices and interfaces 154 may include one or more display devices 157, such as a monitor, that allows a visual presentation of data to a user. More particularly, display devices may provide for presentation of GUIs, application software data, and multimedia presentations, for example. Computing device 150 may also include one or more multimedia devices 152, such as speakers, video cards, graphics accelerators, and microphones, for example. Exemplary computing devices may include an Apple Macintosh, Windows based computing devices, Linux based computing devices, or mobile devices, such as Apple's iPhone and iPod touch devices.

Figure 1B:
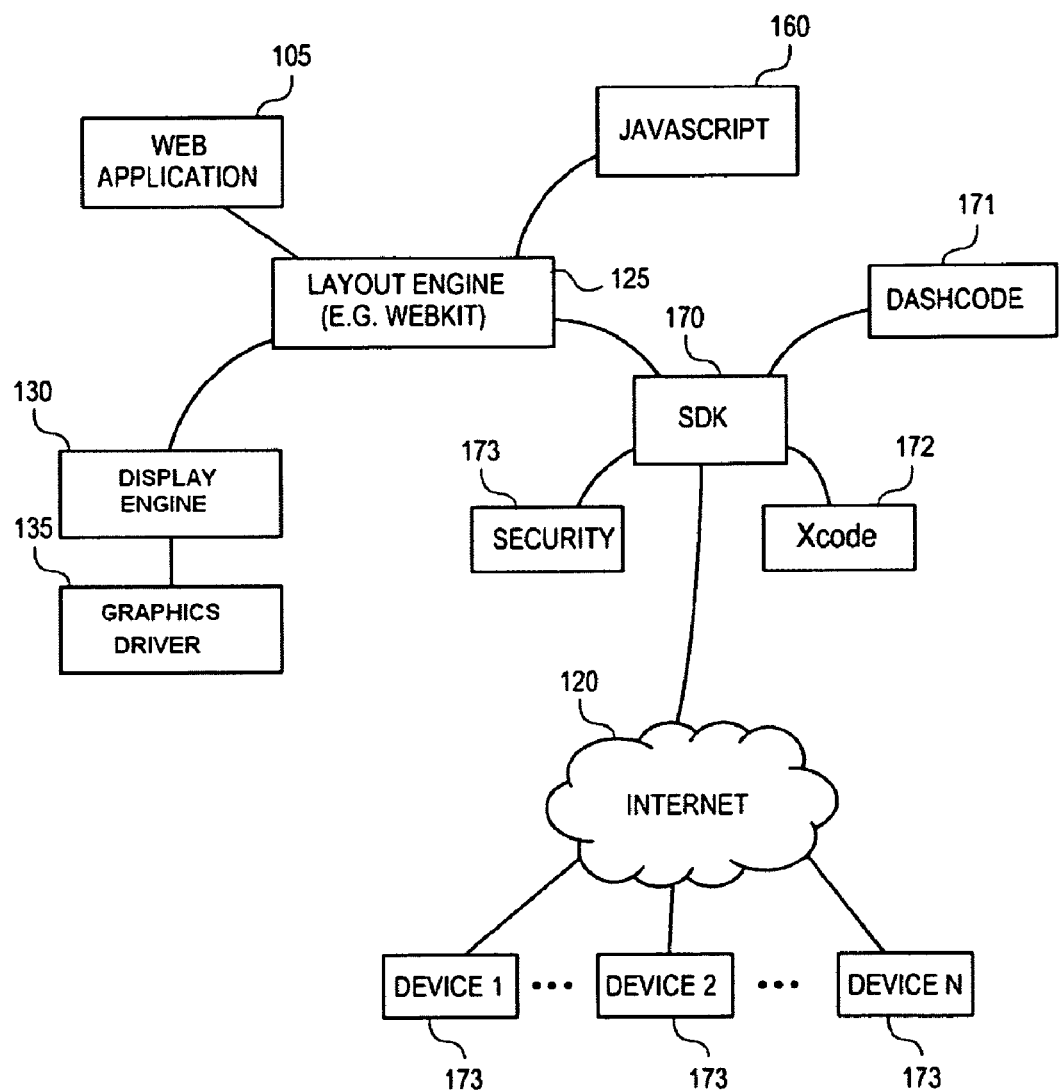
FIG. 1B shows an exemplary block diagram of the layout engine with a software development kit.

FIG. 1B shows an exemplary block diagram of layout engine 125 with software development kit (SDK) 170. In an exemplary embodiment, a developer may use SDK 170 in conjunction with layout engine 125 to form web applications. These web applications may be loaded on various mobile and desktop devices 173 across Internet 120 or be loaded locally onto devices 173.

To form user interface widgets, developer platform such as Dashcode 171 may be used. It may be appreciated that user interface widgets are "miniature applications" that may provide a variety of functions, such as stock and weather checking. It may be appreciated that other developer platforms may also be used to create web applications.

To protect the security of SDK 170 and web application 105 derived from SDK 170, security mechanism 173 may be used. In one embodiment, a developer may be provided with a key/token after signing up as a developer and providing a list of mobile device (e.g. iPhone, iPod touch) identifiers to an organization, such as Apple Inc. The organization may then embed keys in the mobile devices so that the keys are trusted, and the developer can use the keys to sign applications for specific devices. These keys allow the developer to develop applications for mobile devices. In one embodiment, the developer can then compile and sign applications for his/her mobile device, known as code signing. However, the developer be prevented from posting the application on a network, such as the Internet in a form that other people can download and use.

The CSS visual formatting model describes a coordinate system within which each element may be positioned. Positions and sizes in this coordinate space can be thought of as being expressed in pixels, starting in the upper left corner of the parent with positive values proceeding to the right and down.

CSS transforms are a method of transforming objects in document content using only CSS and HTML. In one embodiment, using CSS transforms allows a developer of web applications to develop web applications that utilize various transformational properties of CSS transforms to manipulate one or more objects being displayed on the screen. In an advantageous environment, the objects can be displayed on a visual display to a user and be manipulated with or without feedback from the user.

In one embodiment, the CSS transforms do not affect the flow of the current surroundings of the web application and/or web page. However, in one embodiment, the value of an overflow area caused by the transform takes into account transformed elements. For example, this behavior may be similar to what happens when elements are translated via relative positioning. If the value of a CSS transform overflow property is "scroll" or "auto," then scrollbars may appear as needed to allow viewing of content transformed outside a visible area.

CSS transforms use a syntax model in order to define certain parameters for a given object in a document content. In one embodiment, the syntax model may be defined as follows:

webkit-transform: [CSS transform property](attributes1, attributes2, attributesN);

However, the syntactical structure of the CSS transforms may vary. Of note, the properties described herein can comply with the existing syntactic rules of CSS. Embodiments of the present disclosure may, however, may provide new names of the properties and how their values are described.

In one embodiment, certain elements, such as the "webkit" prefix, may not be needed if these properties are adopted by the W3C organization. As mentioned above, specific properties of CSS transforms may include scaling, rotating, translating, skewing, transform matrices, perspective, origin, and style. A brief explanation of these transformational properties may be displayed in the table below:

| CSS transform property | Explanation |
| --- | --- |
| scale, scaleX, scaleY | Scale an object around the transform origin. |
| rotate | Rotate an object around the transform origin. |
| translate, translateX, translateY | Translate an object. |
| skew, skewX, skewY | Skew an object. |
| matrix | Specify a full transform matrix. |
| perspective | Gives an object perspective. |
| transform-origin | Rotates an object around a defined origin. |
| transform-style | Defines how nested elements are rendered in 3D space |
| back-face visible | Defines visibility of a backface of a two-dimensional figure |

A more detailed explanation of each of these properties may be explained below using a CSS created box as a reference point. In one embodiment, a CSS box can be created using the following CSS code:

```
<style type="text/css">
.showbox {
float: left;
margin: 4em 1em;
width: 100px;
height: 60px;
border: 1px solid green;
background-color: #fff;
line-height: 60px;
text-align: center;
}
</style>
```

The previous CSS code defines a CSS created box with a width of 100px, a height of 60px, with a 1px solid green border. The "float:left" applies to the box itself, and may control how the box is positioned relative to surrounding elements. It does not affect the text within the box, which is horizontally centered by the "text-align" rule.

Figure 2A:
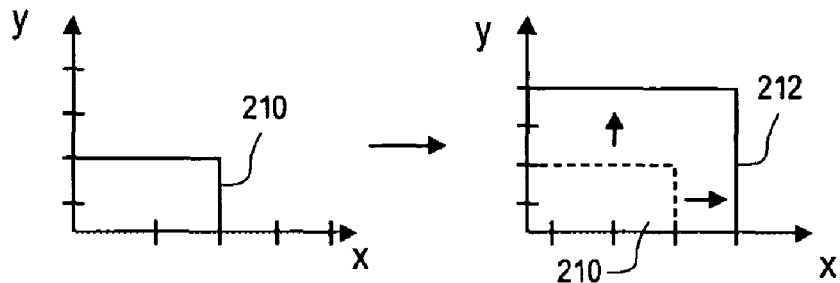
FIG. 2A is an exemplary graph of a scaling in the x-y Cartesian coordinate system.
Figure 2B:
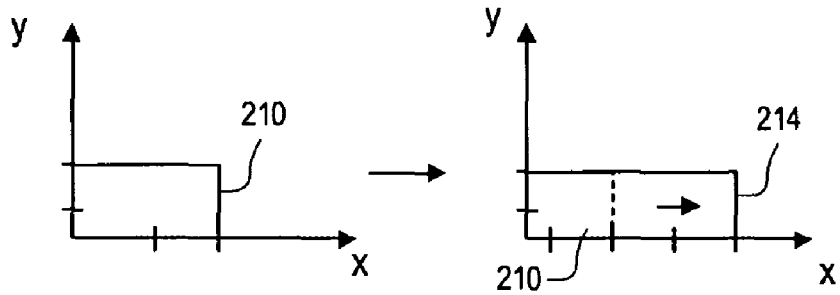
FIG. 2B is an exemplary graph of a scaling in the x-direction in the Cartesian coordinate system.
Figure 2C:
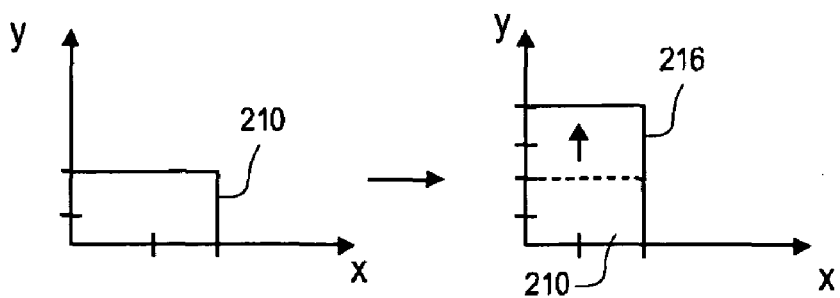
FIG. 2C is an exemplary graph of a scaling in the y-direction in the Cartesian coordinate system.

In one embodiment, a scale transform may be used to manipulate an object. Scaling may refer to a change in shape and/or size of an object. Using the property scale, an object may scale in size (increasing or decreasing) according to attributes defined in the CSS transform syntax. Attributes assigned to the scale transform can be positive, or negative to flip an object. Accordingly, using the property scaleX, an object may scale (increasing or decreasing) in size in the x-coordinate plane using the Cartesian coordinate system. Likewise, using the property scaleY, an object may scale (increasing or decreasing) in size in the y-coordinate plane using the Cartesian coordinate system. Likewise, using the property scaleZ, an object may scale (increasing or decreasing) in size in the z-coordinate plane. In one embodiment, scaleX, scaleY, and scaleZ can be represented using a system of scaling vectors: [sx,1,1], [1,sy,1], [1,1,sz] respectively. FIGS. 2A, 2B, 2C illustrate box 210 scaled in twice in size in the x-y plane (box 212), x-plane (box 214), and the y-plane (box 216), respectively.

In one embodiment, the CSS transform property, scale3d, may be used to specify a three-dimensional scale operation by the [sx,sy,sz] scaling vector as described by the 3 parameters. Thus, a two-dimensional or three-dimensional object may be scaled along the x, y, or z axis. Objects other than boxes, such as images and text may be transformed using the scale CSS transform property.

In one embodiment, a rotate transform may be used to manipulate an object. In one embodiment, rotation may refer to a rotation of an object. Using the rotate property, an object may rotate clockwise around an axis a number of radians or degrees. As in the scale transform, rotateX, rotateY, rotateZ, and rotate3d may be used to rotate an object around the x-axis, y-axis, z-axis, and along the three-dimensional coordinate plane as specified in the attributes. In one embodiment, the rotate transform may correspond to the following 2×3 matrix:

| cos(a) | sin(a) | −sin(a) |
| --- | --- | --- |
| cos(a) | 0 | 0 |

Figure 3A:
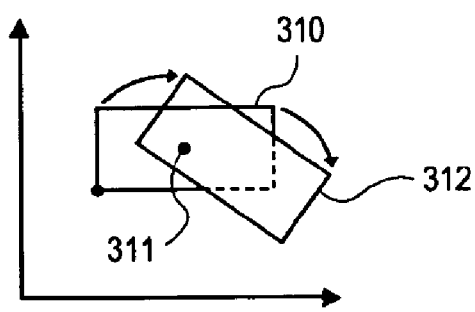
FIG. 3A is an exemplary rotation of a CSS created figure rotated 30 degrees about its center.
Figure 3B:
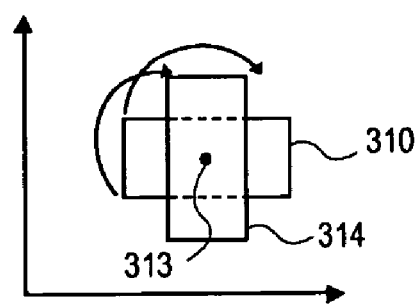
FIG. 3B is an exemplary rotation of a CSS created figure rotated 90 degrees about its center.

However, it may be appreciated that other matrices with different rows and columns may be used. FIG. 3A show block 310 rotated thirty degrees around origin 311 to become block 312. FIG. 3B show block 310 rotated ninety degrees around origin 313 to become block 314.

In one embodiment, a translate transform may be used to manipulate an object. In one embodiment, translation may refer to the displacement of an object relative to the original location of the object. In one embodiment, an object may be translated around the x-axis, y-axis, and/or z-axis.

Figure 4:
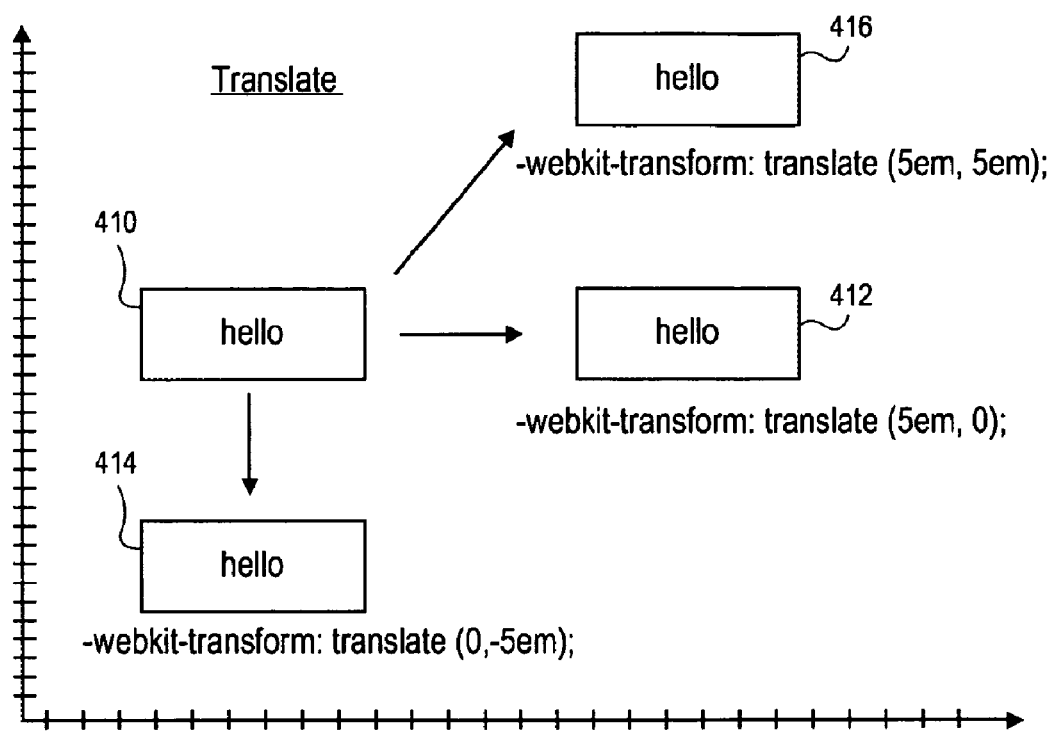
FIG. 4 shows several exemplary translations of a CSS created figure.

FIG. 4 shows block 410 translated along the x-axis 10em, along the y-axis −10em, and along the x-y axis 10em as shown in blocks 412, 414, and 416 respectively. As box 410 translates to either block 412, 414, 416, then block 410 may be displaced from its original location. As in the scale transform, translated, translatedY, translateZ, and translate3d may be used to translate an object around the x-axis, y-axis, z-axis, and along the three-dimensional coordinate plane as specified in the attributes. In one embodiment, different measurement values, in addition to em units may be used, such as points, picas, and/or millimeters.

In one embodiment, a skew transform may be used to manipulate an object. In one embodiment, skewing may refer to an oblique or slanted shape of a given object. In one embodiment, an object may be skewed around the x-axis, y-axis, and/or z-axis.

Figure 5:
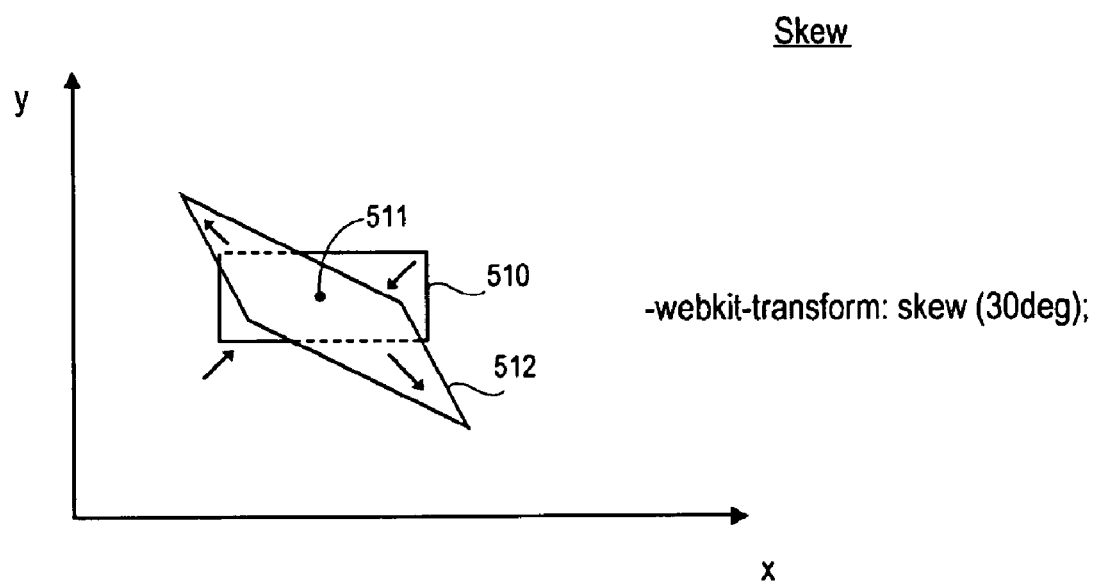
FIG. 5 is an exemplary CSS created figure.

FIG. 5 shows block 510 skewed thirty degrees about the origin 511 as shown in block 512. As in the scale transform, skewX, skewY, skewZ, and may be used to translate an object around the x-axis, y-axis, z-axis coordinate plane as specified in the attributes of the skew transform.

Figure 6:
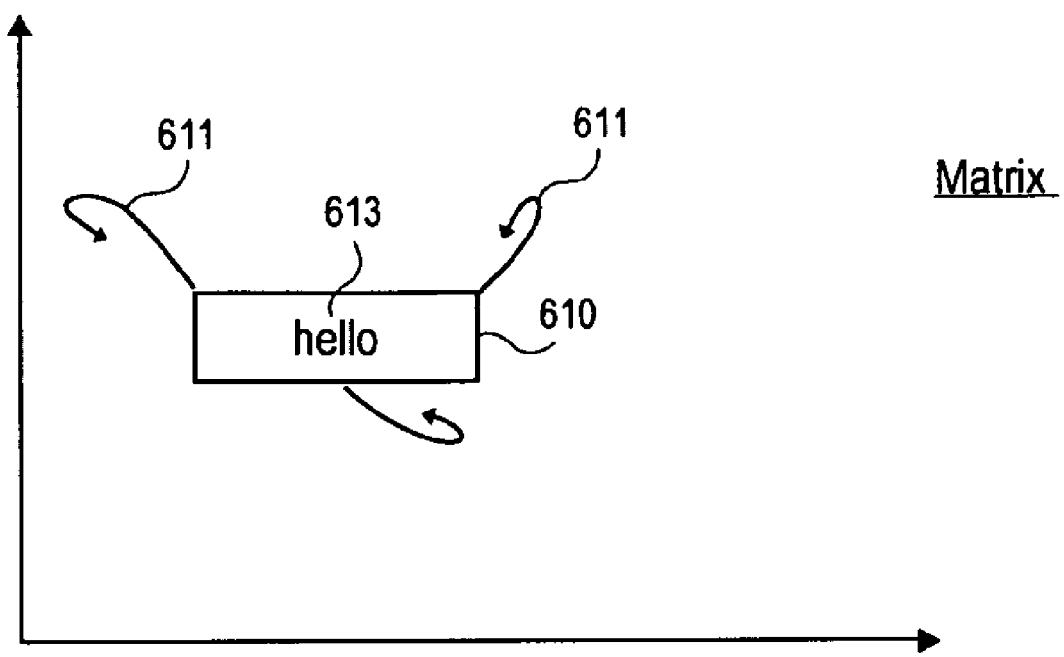
FIG. 6 shows an exemplary CSS created figure about to be rotated in a direction shown.

In one embodiment, a matrix transform may be used to manipulate an object. In one embodiment, a matrix may be defined to specify a 2D transformation in the form of a transformation matrix of six values. FIG. 6 shows block 610 in its initial state with center 613 before any matrix transforms. Arrows 611 indicate a general direction of the transformation of block 610 under a matrix transformation of matrix (1,1,3, 0,−2,−2). In one embodiment, this matrix transformation may be a multiplication of vertices of block 610 by a matrix defined by attributes indicated in a matrix argument. Depending on the embodiment, the matrix transformation may be multiplied by either a 1×6, 2×3, or 3×2 matrix. It may be appreciated that other matrices with different rows and columns may be used. Also, depending on the embodiment, the matrix transformation may be thought of as a multiplication of various smaller matrices.

In one embodiment, a matrix3d transform may be defined to manipulate an object. In an exemplary embodiment, the matrix3d transform may be defined as follows:

```
matrix3d(<number>, <number>, <number>, <number>,
    <number>, <number>, <number>, <number>,
    <number>, <number>, <number>, <number>,
    <number>, <number>, <number>, <number>)
```

This matrix3D transform specifies a 3D transformation as a 4×4 homogeneous matrix of 16 values in column-major order.

In one embodiment, a perspective transform may be used to manipulate an object in order to give a sense of depth to the way objects are displayed. In one embodiment, the perspective transform may specify a perspective projection matrix that maps a viewing cube onto a truncated pyramid whose base represents the furthest visible z value and whose peak represents the viewer's position. The viewing cube may be defined as the region bounded by the four edges of the viewport (the portion of the browser window used for rendering the webpage plus the nearest and furthest z values of the screen). A depth, given as the parameter to the perspective function, represents the height of the pyramid. Lower values give a more flattened pyramid and therefore a more pronounced pyramid effect.

Figure 7:
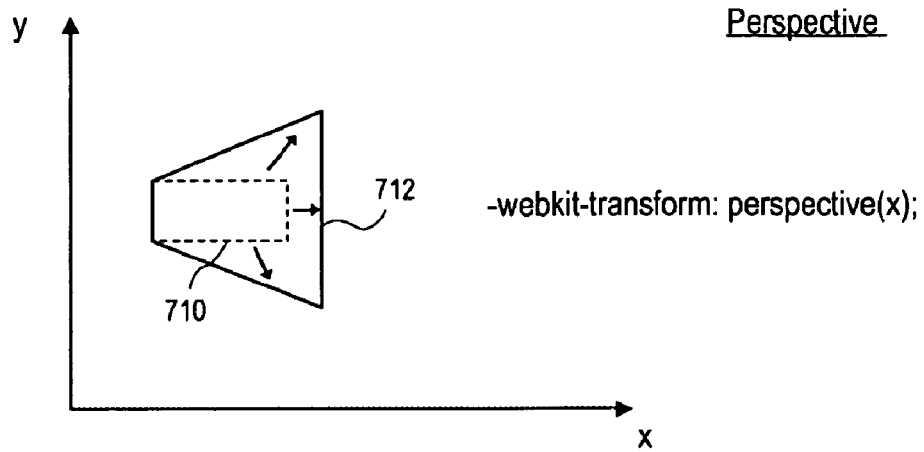
FIG. 7 is an exemplary perspective transform of a CSS created figure.

FIG. 7 gives an exemplary example using the perspective transform on block 710. Block 712 shows a result of the perspective transform with an attribute of 20. Larger and smaller values of the perspective transform may give an object a more realistic appearance if it has been rotated a certain number of degrees.

In one embodiment, a transform-origin transform may be used to manipulate an object in order to scale around a defined origin of the object. The transform-origin transform may be used to define an origin for an object and then scale the object around that origin. In one embodiment, the transform-origin transform may be applied by first translating an element by a negated value of attributes assigned to the transform, then applying the object's transform and then translating by the attribute value. In this method, the method effectively moves the desired transformation origin of the object to (0,0) in the local Cartesian coordinate system, then applies the object's transform, and then moves the object back to its original position.

Figure 8A:
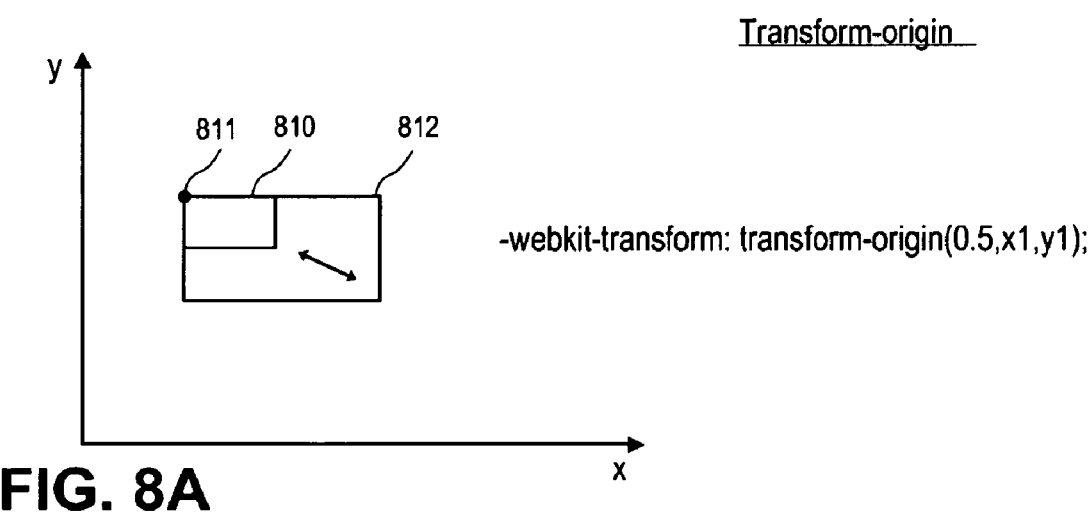
FIG. 8A is an exemplary transform of a CSS created figure about a user-defined origin.
Figure 8B:
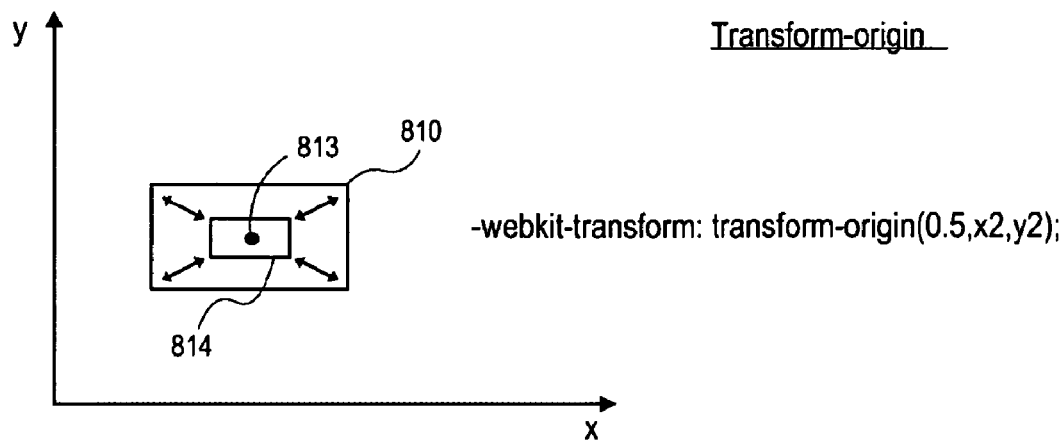
FIG. 8B is another exemplary transform of a CSS created figure about a user-defined origin.

FIG. 8A and FIG. 8B both show block 810 transformed by using the transform-origin transform. In FIG. 8A, block 812 has been scaled down 50% around origin 811 of (x1, y1) in the local coordinate plane to form block 810. In FIG. 8B, block 810 has also been scaled down 50% around origin 813 of (x2, y2) to produce block 814.

In one embodiment, a transform-style transform may be used to manipulate an object in order to specify a hierarchy of transforms and which styles to apply to those transforms. This particular transform defines how nested objects are rendered in three-dimensional space. In one embodiment, if the transform-style has a value of "flat," all children of this element are rendered flattened into the 2D plane of the element. Therefore, rotating the element about the X or Y axes may cause children positioned at positive or negative Z positions to appear on the element's plane, rather than in front of or behind it. In one embodiment, if the transform-style has a value of "perspective," this flattening may not be performed, so children maintain their position in 3D space. This flattening takes place at each element, so preserving a hierarchy of elements in 3D space requires that each ancestor in the hierarchy have the value "perspective" for transform-style. But since the transform-style affects only an element's children, the leaf nodes in a hierarchy do not require the perspective style.

Figure 9:
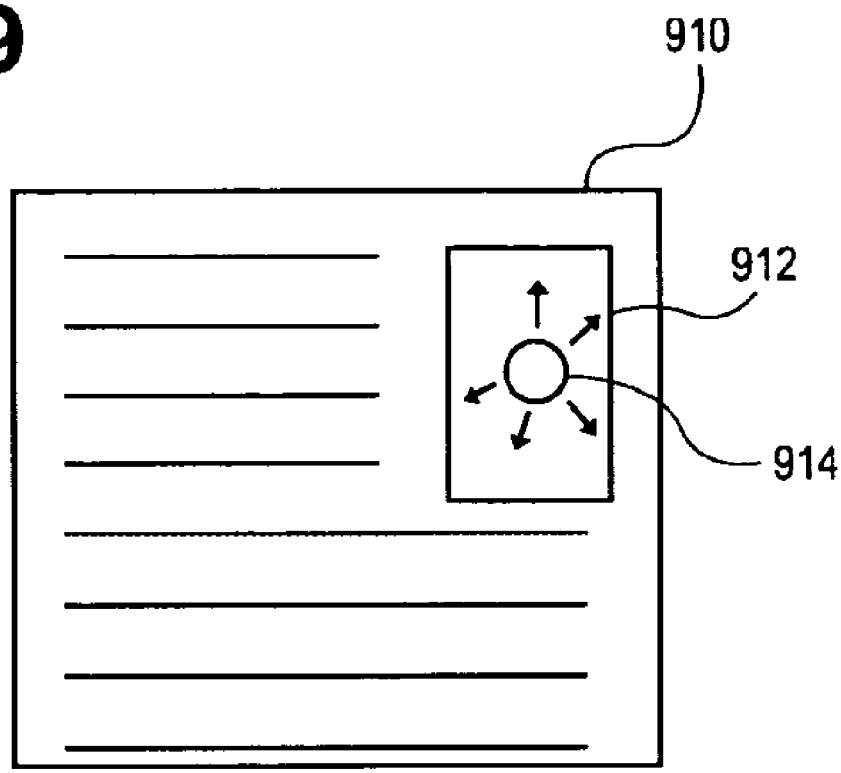
FIG. 9 is an exemplary example of transforming a figure in a nested structure.

In other words, the transform-style transform allows for selective application of a style to any level of a hierarchy. As shown in FIG. 9, object 910 may be considered the parent and objects 912 and 914 may be considered child #1 and child #2 of parent 910, respectively. In one embodiment, object 912 may be positioned at positive or negative positions on the z-axis of a three-dimensional coordinate axis relative to object 914. In one embodiment, any of a particular transform may be applied to object 912 independent of object 914. Selective application of a transform may be applied to any level of the parent-child hierarchy.

Figure 10A:
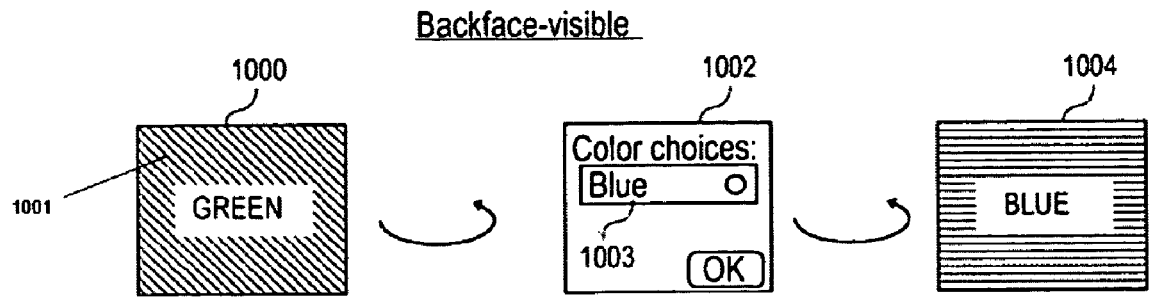
FIG. 10A is an exemplary web application rotated around to control aspects of the application.

Backface-visibility may be a visibility property having values of "visible" or "hidden." Backface-visibility applies to the back side of an object that has been transformed in three dimensions. This particular property thus allows a two-dimensional object to be created with information along both sides of the object, visible or not. For example, two-dimensional green-colored square 1000 can be created with green side 1001 facing the user, as shown in FIG. 10A. A user can then "flip" the green-colored square around to expose other side 1002 of square 1000 where drop-down menu 1003 of other color choices, such as red, orange, blue, and yellow, may be selected. Upon selecting a new color choice, square 1000 can be "flipped" back to its original state in newly selected color 1004.

Figure 10B:
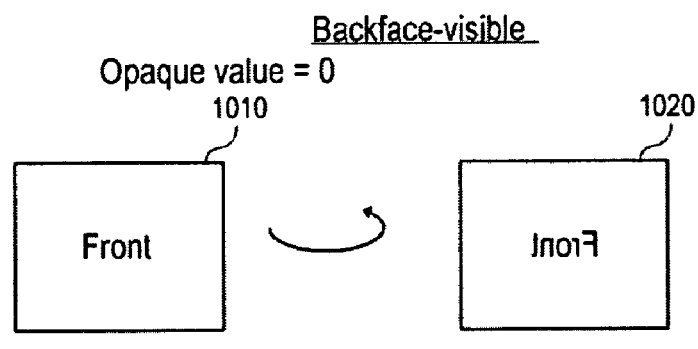
FIG. 10B is an exemplary example of opaque values in a backface transform.
Figure 10B:
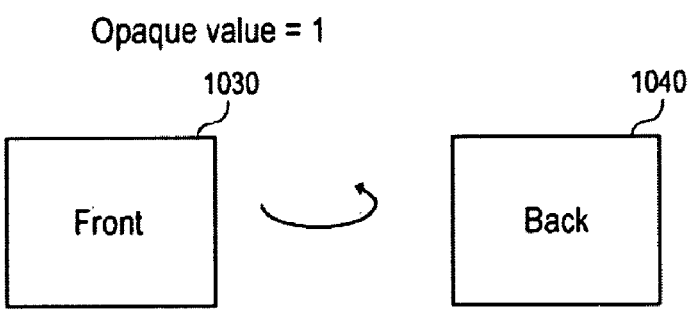
Figure 10C:
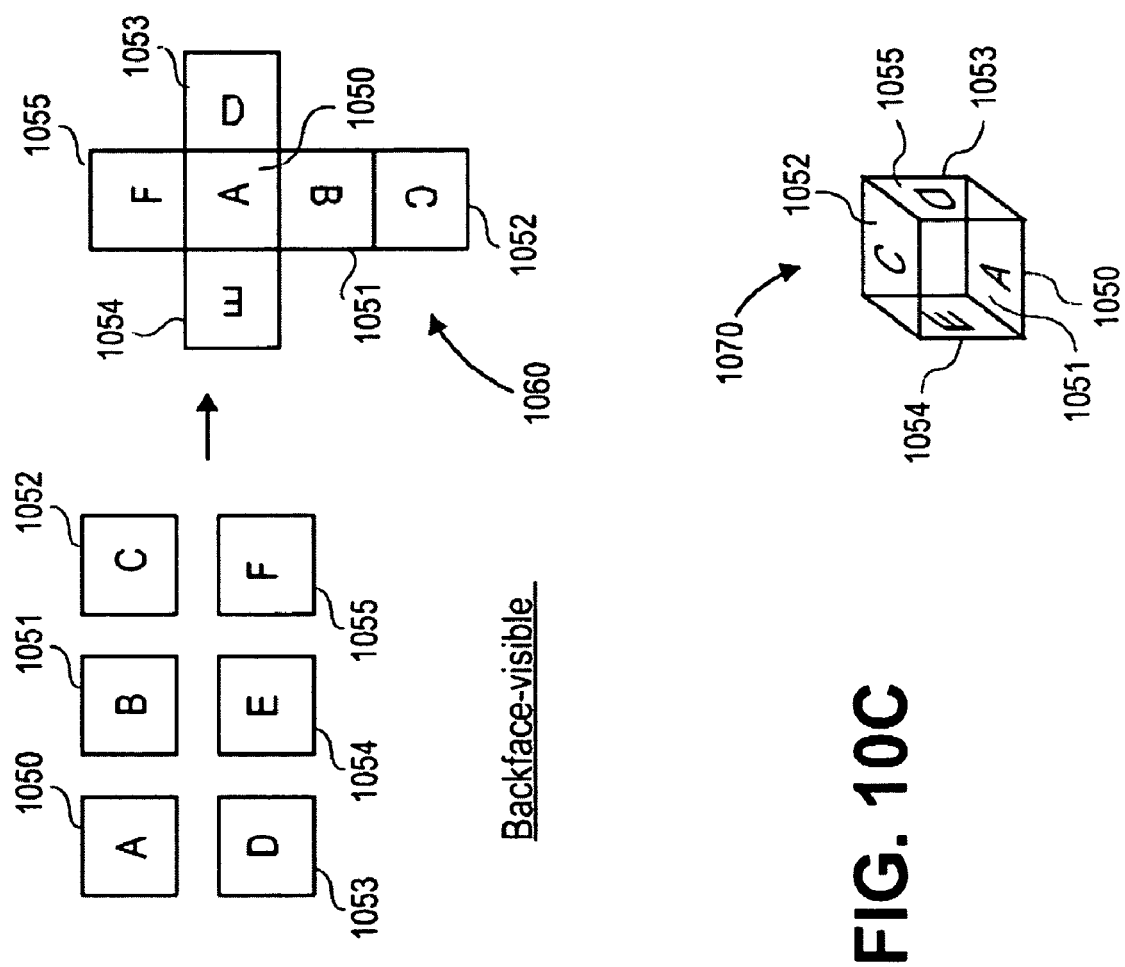
FIG. 10C is an exemplary example of using six individual CSS figures to create a virtual world.

One embodiment, illustrated in FIG. 10C, uses CSS and six images 1050, 1051, 1052, 1053, 1054, and 1055 in the shape of squares, six images 1050, 1051, 1052, 1053, 1054, and 1055 which can be combined together to form three-dimensional box 1070. In one embodiment, a user perspective can be virtually situated inside the box 1070 and then visualize the images from within the box in a pseudo three-dimensional world. In one embodiment, block 1060 may be used as an intermediary step between images 1050, 1051, 1052, 1053, 1054, and 1055 and block 1070.

In one embodiment, an opaqueness value may be selected for the square in the prior example. In one embodiment, the opaqueness value may be selected from a range of 0-1, where a value of "0" may indicate no opaqueness while a value of "1" may indicate full opaqueness. FIG. 10B shows block 1010 with opaqueness value "0" flipped around showing the other face 1020. Likewise, block 1030 with opaqueness value "1" flipped around to show backside 1040.

Javascript may be used for client-side web development. In one embodiment, Javascript can be combined with CSS transforms to transform various objects in a web application or on a webpage. Furthermore, the Javascript CSS combination can be used to apply various styles to an object. For example, the following code snippet may be used to apply a style to rotate element "e" twenty degrees:

e.style.transform="rotate(20 deg)".

Element "e" may reference an object, "style.transform" may refer to a style of type "transform" to element "e," and rotate(x°) may refer to the number of degrees to rotate element "e."

In one embodiment, the previous code snippet may be applied to matrices in the exemplary code snippet:

```
e.style.transform = "rotate(x°)";
var m = example.transform;
m.multiply(mm);
e.style.transform = m;
```

The previous code snippet shows how Javascript and a Javascript like syntax may be used to define certain transforms on an object, in addition to applying a current transform to a variable. Using Javascript, matrices can be multiplied and the resulting matrix can then be applied to a particular transform.

In one embodiment, by using Javascript, it is possible to create and assign transform values in JavaScript, thus allowing sets of related transforms to be described programmatically, and dynamically.

Referring back to FIGS. 1A and 1B, the new CSS model for CSS transforms and CSS animations may be referenced using SDK 170. In one embodiment, using SDK 170, a developer can reference information in CSS for software development models. As mentioned above, SDK 170 may use layout engine 125 and JavaScript 160 to form web applications for mobile or desktop devices. Furthermore, these web applications have a security level, limiting certain access rights, as explained earlier. However, embodiments of the present invention apply equally to desktop browsers or browsers on any sort of electronic device.

As mentioned above, animation refers to any animated quality, liveliness, vivacity, and/or spirit of an object in a webpage or web application. Using CSS animations, CSS transforms can be animated to show a transition between one state to another state.

Normally, when the value of a CSS property changes, the rendered result may be instantly updated, with the changed elements immediately changing from the old property value to the new property value. Using new CSS properties, transitions may be made to animate smoothly from the old state to the new state over a selected time interval.

In one embodiment, CSS animations should have one or more property definitions specifying additional information: whether or not it may be animatable and how it should animate. In one embodiment, animatable properties are all of those that allow values of the type integer, number, length, percentage, color, time, angle, or transform list, for example. Additionally, some properties that take keyword values, such as visibility, may combine with typical timing functions and animations. For example, visibility may be used in conjunction with timing functions to cause an object to show when an animation started and hide when the animation ended.

CSS animation allows for two types of animation. The first type of animation are implicit transitions, which describe how CSS properties can be made to change smoothly from one value to another. The second type of animation are defined animations, which define values that CSS properties may take over a selected time interval.

An object may have a property assigned to that object indicating specific properties that the object may have. For example, properties, such as opacity levels and colors may be assigned to an object. For example:
div{transition-property:opacity;};

defines a transition on the opacity property for all <div> elements. Thus, when a new value may be assigned to the opacity property, a smooth transition may occur between the old opacity value and the new opacity value. However, each of the transition properties can accept a comma-separated list, allowing multiple transitions to be defined, each transition acting on a different property. For example:
div{transition-property:opacity,left;} may define a transition property on the opacity property and the left property.

Additionally, durations, or a specified interval of time, may be set over which to animate an object. Thus, when a transition-duration and a transition-property are assigned to an object, then the object may animate according to the assigned property for a duration of time as assigned by the transition-duration property. For example:

```
div {
    transition-property: opacity, left;
    transition-duration: 2s, 4s;
}
``` may cause the opacity property to transition over a period of two seconds and the left property to transition over a period of four seconds.

Figure 11:
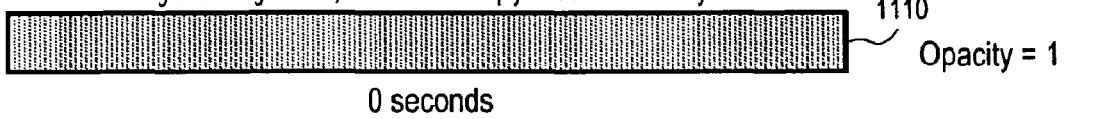
FIG. 11 is an exemplary example of animating opacity values of a CSS created figure.
Figure 11:
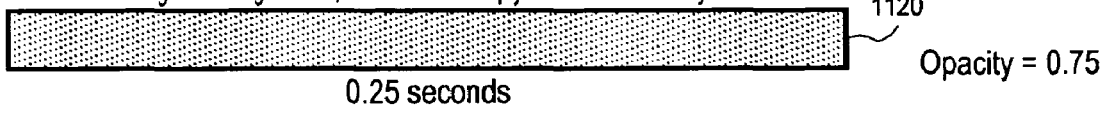
Figure 11:
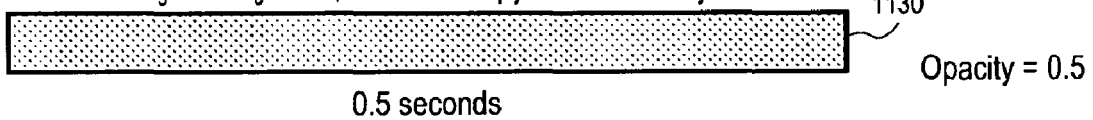
Figure 11:
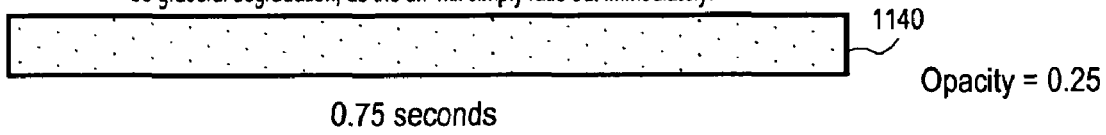

FIG. 11 shows an exemplary embodiment of the transition-duration property combined with the transition-property property. In this embodiment, block 1110 may be assigned an opacity value "1" and set to fade-out (i.e. go from opacity value "1" to an opacity value "0") over a period of one second. Block 1120 shows block 1110 after 0.25 seconds with an opacity value 0.75. After 0.5 seconds, block 1130 shows block 1110 with an opacity value 0.75. After 0.75 seconds, block 1140 shows block 1110 with an opacity value 0.5. Accordingly, after 1 second, block 1110 would have an opacity value 0 and will not be visible.

Although FIG. 11 shows a clean and smooth transition between block 1110 and block 1140, older document rendering models may not necessarily support CSS transforms and CSS animations. However, in these older document rendering models, block 1110 may degrade from block 1110 to being invisible without intermediate blocks 1120, 1130, 1140. This graceful degrading may work in other CSS transitions and CSS animations, such as skewing and translation in addition to opacity changes and timing durations.

In one embodiment, a keypath syntax may be specified for the transition-property property. A keypath syntax would enable different transitions to be specified for components of a property. For example, the blur of a shadow could have a different transition than the color of a shadow.

The transition-timing-function property describes how intermediate values used during a transition may be calculated. For example, if a square has a transform property indicating to move from point A to point B, then the transition-timing-function may indicate exactly how the square moves from point A to point B. Furthermore, the transition-timing-function allows for a transition to change speed over its duration. In one embodiment, these transitions are commonly called easing functions and depend on a mathematical function called a cubic Bézier curve to provide a smooth transition between the transitions.

In one embodiment, the cubic Bézier curve may be defined by four control points, P0 through P3. P0 and P3 may be always set to values (0, 0) and (1, 1) respectively. Thus, the transition-timing-function can be used to specify values for points P1 and P2. These values can be set to preset values using the keywords listed below, or can be set to specific values using the cubic-bezier function. In the cubic-bezier function, P1 and P2 are each specified by both an X and Y value.

| Name of timing function | cubic-bezier attributes |
| --- | --- |
| default | cubic-bezier (0.25, 0.1, 0.25, 1.0) |
| linear | cubic-bezier (0.0, 0.0, 1.0, 1.0) |
| ease-in | cubic-bezier (0.42, 0, 1.0, 1.0) |
| ease-out | cubic-bezier (0, 0, 0.58, 1.0) |
| ease-in-out | cubic-bezier (0.42, 0, 0.58, 1) |

Figure 12:
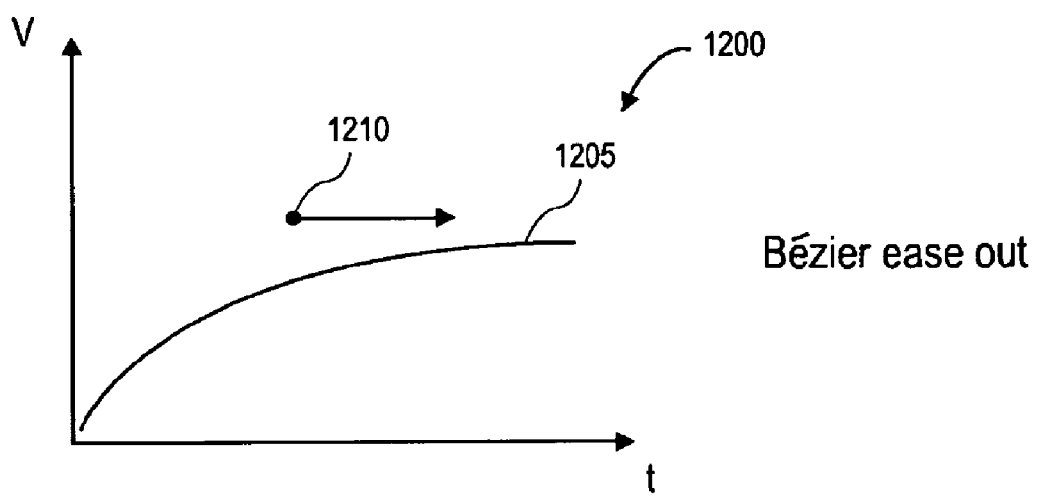
FIG. 12 is an exemplary example of using Bézier curves to model CSS animations.
Figure 12:
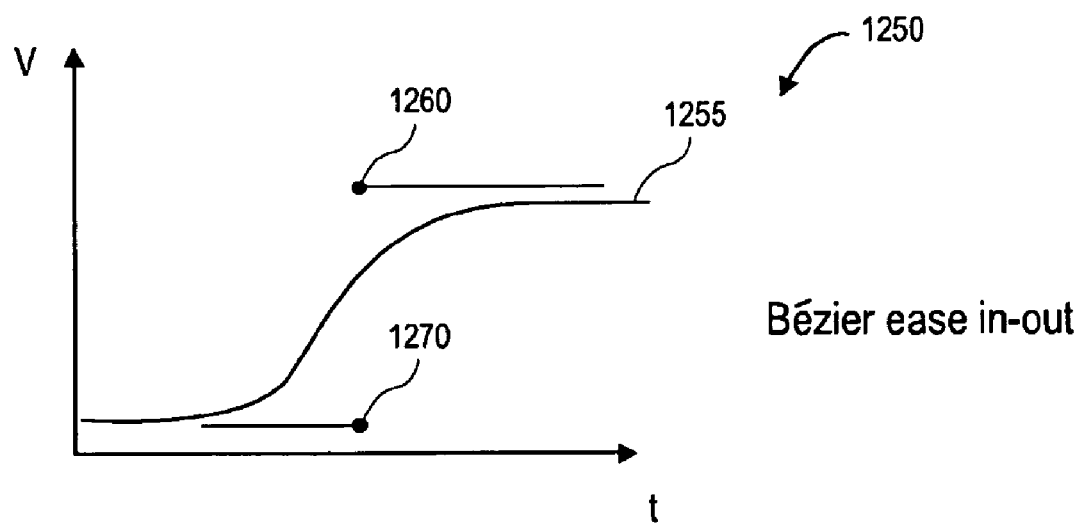

FIG. 12 shows two Bézier graphs 1200 and 1250 showing exemplary Bézier curves 1205 and 1255 for the ease-out and ease-in-out timing functions. As can be seen in graph 1200, control point 1210 may be placed to indicate where the curve 1105 may go for the ease-out timing function. Likewise, in graph 1250, two control points 1260, 1270 are placed near the top and bottom of curve 1255 to indicate how the curve may go for the ease-in-out timing function. Thus, a transition following these timing functions may follow the Bézier curves when going from one point to another point.

In one embodiment, a delay in the transition may be needed in order to keep several objects within the same webpage or same web application in synchrony with each other. The transition-delay property allows specified delays to be assigned to an individual object such that one object can move after another object, for example. In one embodiment, the delays can be either positive for staged animation or negative for skip ahead animation.

In one embodiment, a transition-name property allows an author of a webpage or web application to provide a name for a transition that may be used to match keyframe rules.

In one embodiment, a simple transition shorthand property may be used to combine the transition-name, transition-timing-function, transition-property, transition-duration, along with any other transitions into a single collective name. Using this shorthand transition property, a developer of a webpage or web application can assign various arguments to the shorthand transition property to assign timing functions and assign a duration, for example. In one embodiment, if a value assigned to an object may be changed midway though a transition, then a new transition may begin from the current position. In another embodiment, if a from/to value (e.g. from one to zero) may be flipped (e.g. from zero to one) on an object, then a new property can be assigned or simply detecting when the from/to values are flipped to assign a new property to the object.

In a simple transition, a single timing function and duration may determine the intermediate values of the animating property. For finer control, keyframes can be used. Keyframes are based on the notion that an object has a beginning state and may be changing over time, in position, form, color, or any other property, to some different final form. Keyframing may use "key" frames to describe a transformation of an object, determining intermediate positions from the "key" frames.

In one embodiment, keyframes are specified using a specialized at-rule. A @keyframes rule consists of the keyword "@keyframes," followed by the name of target transition (using a transition-name) or animation (using an animation-name), followed by a set of style rules (delimited by curly braces).

A keyframe selector for a keyframe style rule may consist of a comma-separated list of percentage values or the keywords "from" or "to." The selector may be used to specify the percentage along the duration of the animation or transition that the keyframe represents (the block of property values declared). The keyword "from" may be equivalent to the value 0. The keyword "to" may be equivalent to the value 100%.

The keyframe declaration for a keyframe rule consists of properties and values. Properties that are not transitioning or animating are ignored in these rules, with the exception of "transition-timing-function" and "animation-timing-function".

The @keyframes rule that may be used by a transition or animation may be the last one encountered in sorted rules order that matches the name of the transition. @keyframes rules do not cascade; therefore a transition or animation may never derive keyframes from more than one @keyframes rule.

In one embodiment, to determine the set of keyframes, all of the values in selectors are sorted in increasing order by time. If there are any duplicates, then the last keyframe specified inside the @keyframes rule may be used to provide the keyframe information for that time. In one embodiment, there may be no cascading within a @keyframes rule if multiple keyframes specify the same keyframe selector values.

Keyframe Example

```
@keyframes "wobble" {
    0 {
        left: 100px;
    }
    40% {
        left: 150px;
    }
    60% {
        left: 75px;
    }
    100% {
        left: 100px;
    }
}
```

Figure 13A:
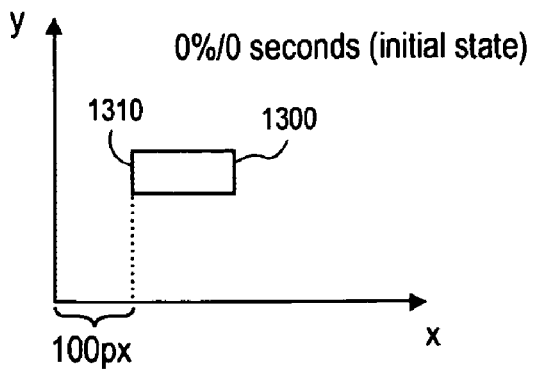
FIGS. 13A-13D illustrate an exemplary animation of a CSS created figure.
Figure 13B:
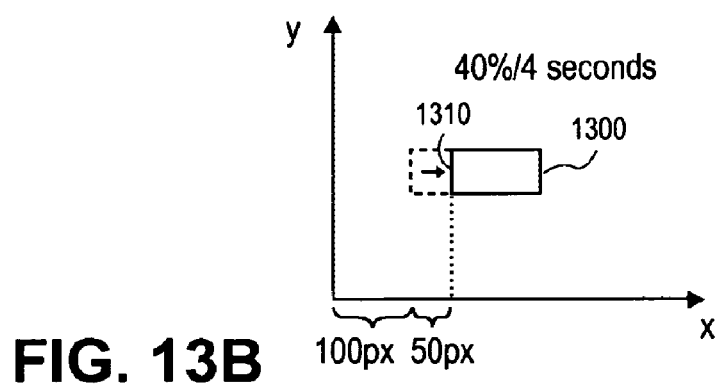
Figure 13C:
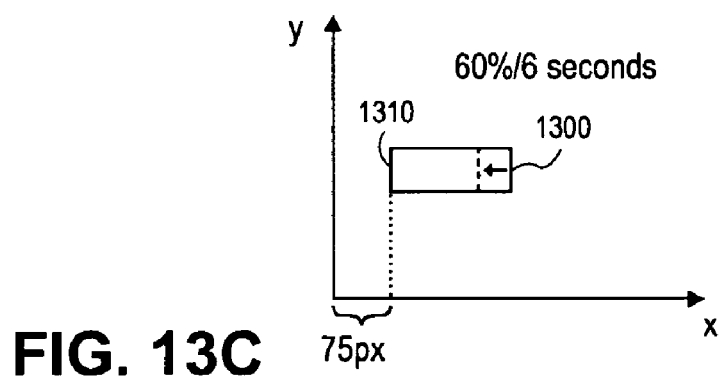
Figure 13D:
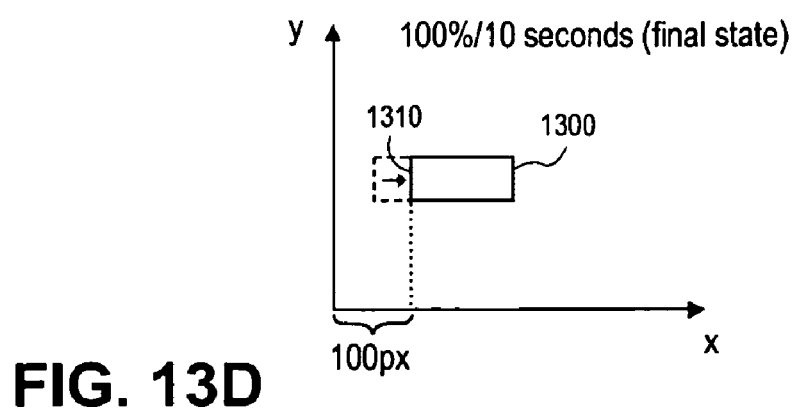

In the code snippet above, four keyframes are used to animate box 1300 in FIG. 13S with left property 1310. An initial state (0%/0 seconds for a 10 second duration) for left property 1310 may be 100px. After 40% or four seconds, box 1300 has left property 1310 of 150px as shown in FIG. 13B. After 60% or six seconds, box 1300 has left property 1310 of 100px as shown in FIG. 13C. Finally, after 100% of the total time duration or 10 seconds, box 1300 has left property of 100px as shown in FIG. 13D, which may be its initial state in FIG. 13A. By keyframing these four frames (FIGS. 13A-D), box 1300 may be left "wobbling" right and left for 10 seconds.

A keyframe style rule may also declare the timing function that may be to be used as the transition or animation moves to the next keyframe. The following code sample shows a "bounce" of an object as indicated by the five keyframes below:

```
@keyframes "bounce" {
    from {
        top: 100px;
        animation-timing-function: ease-out;
    }
    25% {
        top: 50px;
        animation-timing-function: ease-in;
    }
    50% {
        top: 100px;
        animation-timing-function: ease-out;
    }
    75% {
        top: 75px;
        animation-timing-function: ease-in;
    }
    to {
        top: 100px;
    }
}
```

In the embodiment above and between the first and second keyframe (i.e. between 0 and 25%) an "ease-out" timing function may be used. Between the second and third keyframe (i.e. between 25%, and 50%) an "ease-in" timing function may be used and so on. This ease-in ease-out effect may appear as an object that moves up the page 50px, slowing down as it reaches its highest point then speeding up as it falls back to 100px. The second half of the animation behaves in a similar manner, but only moves the element 25px units up the page.

CSS animations are similar to transitions in that they change the presentational value of CSS properties over time. A principal difference may be that while transitions trigger implicitly when property values change, CSS animations are explicitly executed when the animation properties are applied. Because of this, CSS animations require explicit values for the properties being animated. These values are specified using animation keyframes, described above.

Many aspects of the animation can be controlled, including how many times the animation iterates, whether or not it alternates between the begin and end values, and whether or not the animation should be running or paused. An animation can also delay its start time.

```
div {
    animation-name: 'diagonal-slide';
    animation-duration: 5s;
    animation-iteration-count: 10;
}
@keyframes 'diagonal-slide' {
    from {
        left: 0;
        top: 0;
    }
    to {
        left: 100px;
        top: 100px;
    }
}
```

The above code sample may produce an animation that moves an element from (0, 0) to (100px, 100px) over five seconds and repeats itself nine times (for a total of ten iterations).

In one embodiment, a name is defined to select a keyframe at-rule for an animation. Instances of "wobble," "bounce," and "diagonal-slide" have already been used in previous examples as exemplary animation names. It may be appreciated that animation names may be any string combination.

In one embodiment, a duration of time may be assigned to an object when the object may be animating. The length of duration may be any rational or irrational number. Depending on the embodiment, variables may be used to define timing durations.

To describe how an animation may progress over one cycle of its duration, an animation-timing-function property may be used. In one embodiment, the animation-timing-function may work in substantially the same manner as the transition-timing-function.

In order to define how many times an object may animate, an animation-property-count may be used. In one embodiment, the animation-iteration-count may take rational and non-rational numbers to indicate how many times to animate an object. In one embodiment, a variable may be used to define how many times to animate an object. In another embodiment, a value of "infinite" may cause an animation to loop and repeat. In one embodiment, non-integer numbers may cause animation to end part-way through a cycle. In another embodiment, negative values may be treated as a zero. In one embodiment, this zero value property may cause an animation to play in reverse on alternate cycles. In the "diagonal-slide" example above, the iteration count was set to 10.

When animating, it may be useful to define whether or not an animation should play in reverse on alternate cycles. In one embodiment, the animation-direction property specifies if an animation should play in reverse on alternate cycles and may take values of "normal" or "alternate." In one embodiment, if normal is selected, then even and odd counts of each animation iteration may be played in the normal direction specified by one or animation properties. In one embodiment, if alternate is selected, then odd counts of each animation iteration may be played in the normal direction specified by one or animation properties, while even counts of each animation may be played in a reverse direction. When an animation is played in reverse, a timing function assigned to that animation may also be reversed. For example, when played in reverse, an case-in animation would appear to be an ease-out animation.

In one embodiment, an animation-play-state property may define whether an animation is running or paused. A running animation can be paused by setting this property to "paused." To continue running a paused animation, the property can be set to "running." In one embodiment, a paused animation may continue to display the current value of the animation in a static state, as if the time of the animation is constant. In one embodiment, when a paused animation may be resumed, it restarts from the current value, not necessarily from the beginning of the animation. In another embodiment, when a paused animation is resumed, it may restart from the beginning of the animation.

An animation-delay property may define when an animation starts. The animation-delay property allows an animation to begin execution at some period of time after it is applied. An animation-delay value of "now" means the animation may execute as soon as it is applied. Otherwise, a time value may specify an offset from the moment the animation is applied, and the animation may delay execution by that offset.

In one embodiment, if the value for "animation-delay" is a negative time offset then the animation may execute the moment it is applied, but may appear to have begun execution at the specified offset. The animation may appear to begin part-way through its play cycle. In one embodiment, where an animation has implied starting values and a negative animation-delay, starting values are taken from the moment the animation is applied.

In a similar manner to CSS transition shorthand, CSS animation shorthand combines animation properties, such as animation-name, animation-iteration-count, animation-direction, animation-play-state, animation-delay, for example, into a single collective name. Using this animation shorthand property, a developer of a webpage or web application can assign various arguments to the shorthand transition property to assign timing functions and assign a duration, for example.

In one embodiment, an object may have independent attributes (nested attributes) assigned to the object. For example, the following code snippet shows an animation with two variables, "a" and "b." However, these two variables also have nested attributes assigned to them.

```
animation-[ name ]: a, b;
a from { transform: rotate(0°); }
    to   { transform: rotate(60°); }
b from { transform: translate(0em); }
    to   { transform: translate(loop); }
```

Thus, an animation may be desired using variables "a" and "b." In one embodiment, the animation may be run in linear order, first with variable "a" and then with variable "b." However, Javascript, loops, jumps, and other function calls can be used to run the animation from "b" to "a" among other things.

Figure 14A:
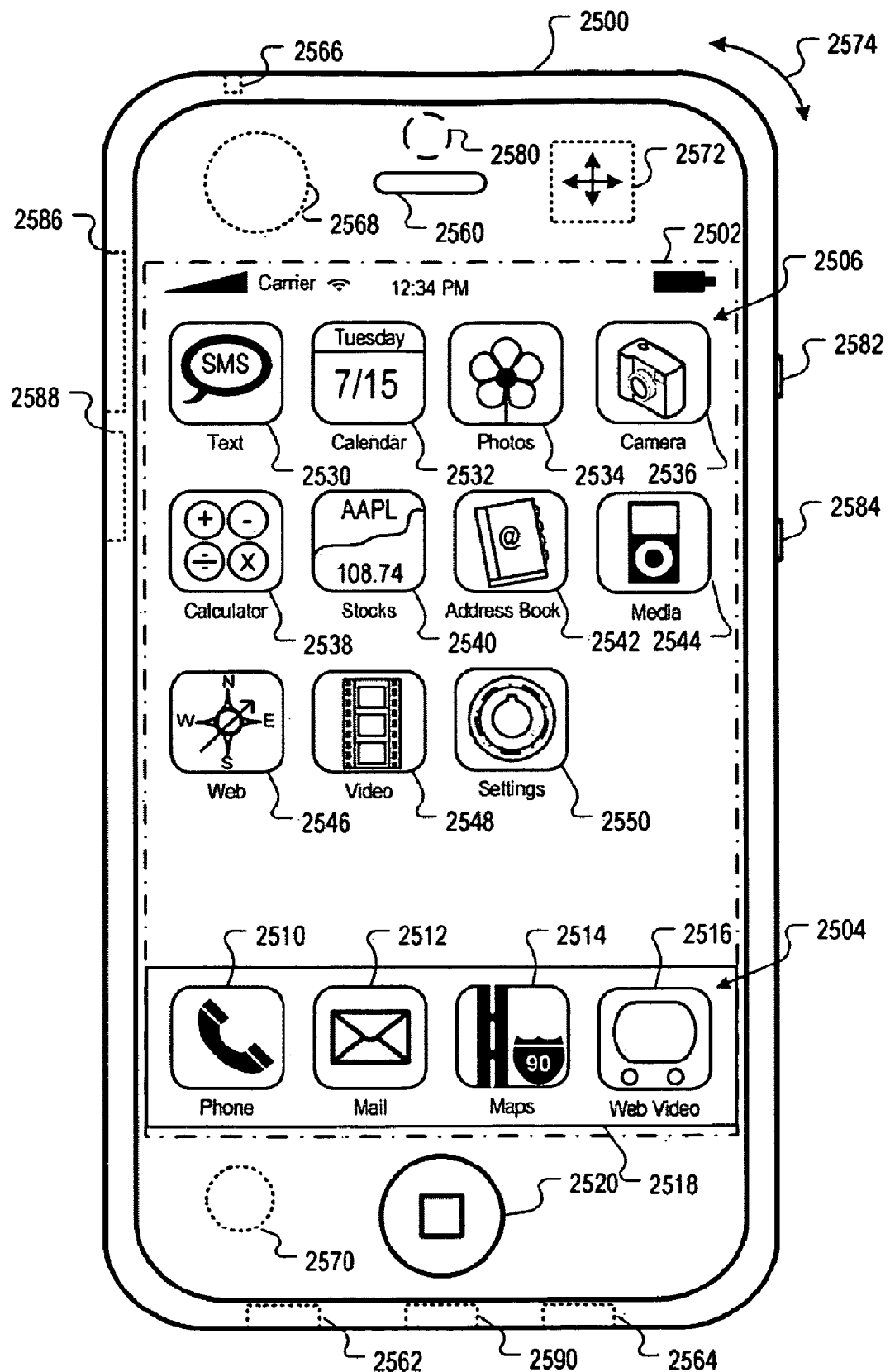
FIG. 14A illustrates an example embodiment of a mobile device.

FIG. 14A illustrates an example mobile device 2500. The mobile device 2500 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 2500 includes a touch-sensitive display 2502. The touch-sensitive display 2502 can be implemented with liquid crystal display (LCD) technology, light emitting polymer display (LPD) technology, or some other display technology. The touch-sensitive display 2502 can be sensitive to haptic and/or tactile contact with a user.

In some implementations, the touch-sensitive display 2502 can include a multi-touch-sensitive display 2502. A multi-touch-sensitive display 2502 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 2500 can display one or more graphical user interfaces on the touch-sensitive display 2502 for providing the user access to various system objects and for conveying information to the user. In some implementations, the graphical user interface can include one or more display objects 2504, 2506. In the example shown, the display objects 2504, 2506, are graphic representations of system objects. Some examples of system objects include device functions, applications, windows, files, alerts, events, or other identifiable system objects.

Example Mobile Device Functionality

In some implementations, the mobile device 2500 can implement multiple device functionalities, such as a telephony device, as indicated by a Phone object 2510; an e-mail device, as indicated by the Mail object 2512; a map device, as indicated by the Maps object 2514; a Wi-Fi base station device (not shown); and a network video transmission and display device, as indicated by the Web Video object 2516. In some implementations, particular display objects 2504, e.g., the Phone object 2510, the Mail object 2512, the Maps object 2514, and the Web Video object 2516, can be displayed in a menu bar 2518. In some implementations, device functionalities can be accessed from a top-level graphical user interface, such as the graphical user interface illustrated in FIG. 14A. Touching one of the objects 2510, 2512, 2514, or 2516 can, for example, invoke a corresponding functionality.

In some implementations, the mobile device 2500 can implement a network distribution functionality. For example, the functionality can enable the user to take the mobile device 2500 and provide access to its associated network while traveling. In particular, the mobile device 2500 can extend Internet access (e.g., Wi-Fi) to other wireless devices in the vicinity. For example, mobile device 2500 can be configured as a base station for one or more devices. As such, mobile device 2500 can grant or deny network access to other wireless devices.

In some implementations, upon invocation of a device functionality, the graphical user interface of the mobile device 2500 changes, or is augmented or replaced with another user interface or user interface elements, to facilitate user access to particular functions associated with the corresponding device functionality. For example, in response to a user touching the Phone object 2510, the graphical user interface of the touch-sensitive display 2502 may present display objects related to various phone functions; likewise, touching of the Mail object 2512 may cause the graphical user interface to present display objects related to various e-mail functions; touching the Maps object 2514 may cause the graphical user interface to present display objects related to various maps functions; and touching the Web Video object 2516 may cause the graphical user interface to present display objects related to various web video functions.

In some implementations, the top-level graphical user interface environment or state of FIG. 14A can be restored by pressing a button 2520 located near the bottom of the mobile device 2500. In some implementations, each corresponding device functionality may have corresponding "home" display objects displayed on the touch-sensitive display 2502, and the graphical user interface environment of FIG. 14A can be restored by pressing the "home" display object.

In some implementations, the top-level graphical user interface can include additional display objects 2506, such as a short messaging service (SMS) object 2530, a Calendar object 2532, a Photos object 2534, a Camera object 2536, a Calculator object 2538, a Stocks object 2540, a Address Book object 2542, a Media object 2544, a Web object 2546, a Video object 2548, a Settings object 2550, and a Notes object (not shown). Touching the SMS display object 2530 can, for example, invoke an SMS messaging environment and supporting functionality; likewise, each selection of a display object 2532, 2534, 2536, 2538, 2540, 2542, 2544, 2546, 2548, and 2550 can invoke a corresponding object environment and functionality.

Additional and/or different display objects can also be displayed in the graphical user interface of FIG. 14A. For example, if the device 2500 is functioning as a base station for other devices, one or more "connection" objects may appear in the graphical user interface to indicate the connection. In some implementations, the display objects 2506 can be configured by a user, e.g., a user may specify which display objects 2506 are displayed, and/or may download additional applications or other software that provides other functionalities and corresponding display objects.

In some implementations, the mobile device 2500 can include one or more input/output (I/O) devices and/or sensor devices. For example, a speaker 2560 and a microphone 2562 can be included to facilitate voice-enabled functionalities, such as phone and voice mail functions. In some implementations, an up/down button 2584 for volume control of the speaker 2560 and the microphone 2562 can be included. The mobile device 2500 can also include an on/off button 2582 for a ring indicator of incoming phone calls. In some implementations, a loud speaker 2564 can be included to facilitate hands-free voice functionalities, such as speaker phone functions. An audio jack 2566 can also be included for use of headphones and/or a microphone.

In some implementations, a proximity sensor 2568 can be included to facilitate the detection of the user positioning the mobile device 2500 proximate to the user's ear and, in response, to disengage the touch-sensitive display 2502 to prevent accidental function invocations. In some implementations, the touch-sensitive display 2502 can be turned off to conserve additional power when the mobile device 2500 is proximate to the user's ear.

Other sensors can also be used. For example, in some implementations, an ambient light sensor 2570 can be utilized to facilitate adjusting the brightness of the touch-sensitive display 2502. In some implementations, an accelerometer 2572 can be utilized to detect movement of the mobile device 2500, as indicated by the directional arrow 2574. Accordingly, display objects and/or media can be presented according to a detected orientation, e.g., portrait or landscape. In some implementations, the mobile device 2500 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 2500 or provided as a separate device that can be coupled to the mobile device 2500 through an interface (e.g., port device 290) to provide access to location-based services.

In some implementations, a port device 2590, e.g., a Universal Serial Bus (USB) port, or a docking port, or some other wired port connection, can be included. The port device 2590 can, for example, be utilized to establish a wired connection to other computing devices, such as other communication devices 2500, network access devices, a personal computer, a printer, a display screen, or other processing devices capable of receiving and/or transmitting data. In some implementations, the port device 2590 allows the mobile device 2500 to synchronize with a host device using one or more protocols, such as, for example, the TCP/IP, HTTP, UDP and any other known protocol.

The mobile device 2500 can also include a camera lens and sensor 2580. In some implementations, the camera lens and sensor 2580 can be located on the back surface of the mobile device 2500. The camera can capture still images and/or video.

The mobile device 2500 can also include one or more wireless communication subsystems, such as an 802.11b/g communication device 2586, and/or a Bluetooth™ communication device 2588. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Configurable Top-Level Graphical User Interface

Figure 14B:
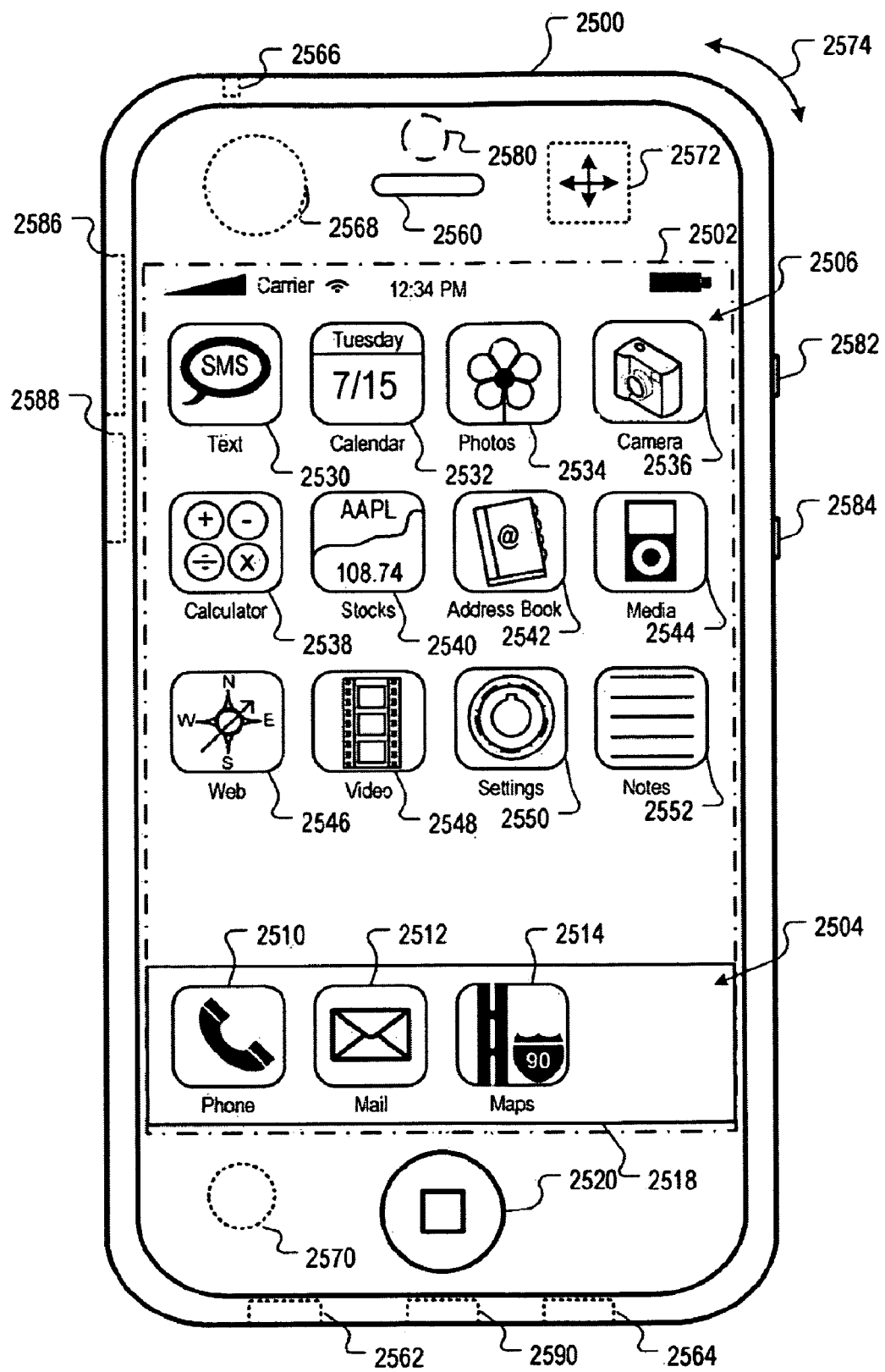
FIG. 14B illustrates an example embodiment of a configurable top-level graphical user interface of a mobile device.

FIG. 14B illustrates another example of configurable top-level graphical user interface of device 2500. The device 2500 can be configured to display a different set of display objects.

In some implementations, each of one or more system objects of device 2500 has a set of system object attributes associated with it; and one of the attributes determines whether a display object for the system object will be rendered in the top-level graphical user interface. This attribute can be set by the system automatically, or by a user through certain programs or system functionalities as described below. FIG. 14B shows an example of how the Notes object 2552 (not shown in FIG. 14A) is added to and the Web Video object 2516 is removed from the top graphical user interface of device 2500 (e.g. such as when the attributes of the Notes system object and the Web Video system object are modified).

Example Mobile Device Architecture

Figure 15:
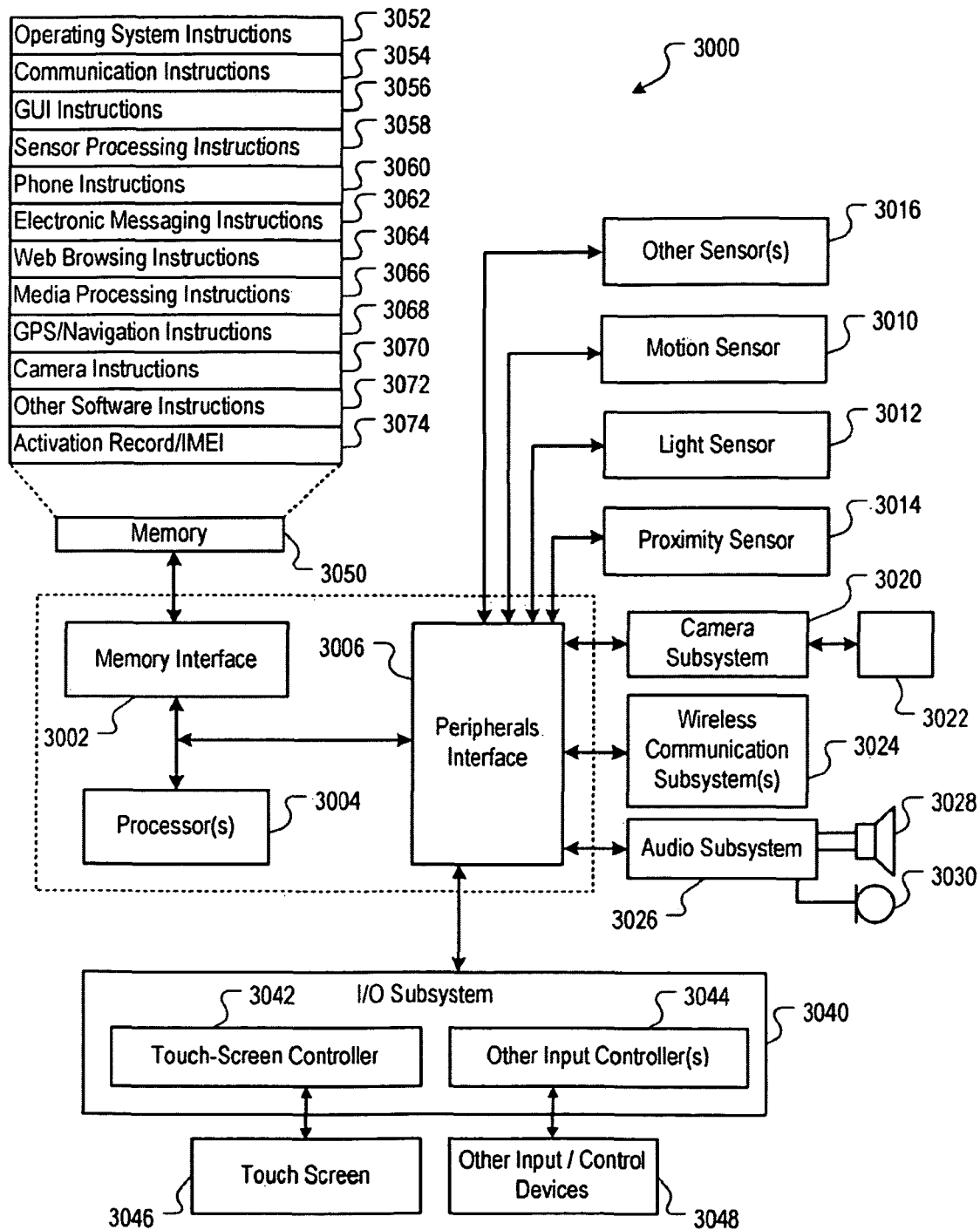
FIG. 15 is a block diagram of an example implementation of a mobile device.

FIG. 15 is a block diagram 3000 of an example implementation of a mobile device (e.g., mobile device 2500). The mobile device can include a memory interface 3002, one or more data processors, image processors and/or central processing units 3004, and a peripherals interface 3006. The memory interface 3002, the one or more processors 3004 and/or the peripherals interface 3006 can be separate components or can be integrated in one or more integrated circuits. The various components in the mobile device can be coupled by one or more communication buses or signal lines.

Sensors, devices, and subsystems can be coupled to the peripherals interface 3006 to facilitate multiple functionalities. For example, a motion sensor 3010, a light sensor 3012, and a proximity sensor 3014 can be coupled to the peripherals interface 3006 to facilitate the orientation, lighting, and proximity functions described with respect to FIG. 14A. Other sensors 3016 can also be connected to the peripherals interface 3006, such as a positioning system (e.g., GPS receiver), a temperature sensor, a biometric sensor, or other sensing device, to facilitate related functionalities.

A camera subsystem 3020 and an optical sensor 3022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 3024, which can include radio frequency receivers and transmitters and/or optical (e.g., infrared) receivers and transmitters. The specific design and implementation of the communication subsystem 3024 can depend on the communication network(s) over which the mobile device is intended to operate. For example, a mobile device can include communication subsystems 3024 designed to operate over a GSM network, a GPRS network, an EDGE network, a Wi-Fi or Wi-Max network, and a Bluetooth™ network. In particular, the wireless communication subsystems 3024 may include hosting protocols such that the mobile device may be configured as a base station for other wireless devices.

An audio subsystem 3026 can be coupled to a speaker 3028 and a microphone 3030 to facilitate voice-enabled functions, such as voice recognition, voice replication, digital recording, and telephony functions.

The I/O subsystem 3040 can include a touch screen controller 3042 and/or other input controller(s) 3044. The touch-screen controller 3042 can be coupled to a touch screen 3046. The touch screen 3046 and touch screen controller 3042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 3046.

The other input controller(s) 3044 can be coupled to other input/control devices 3048, such as one or more buttons, rocker switches, thumb-wheel, infrared port, USB port, and/or a pointer device such as a stylus. The one or more buttons (not shown) can include an up/down button for volume control of the speaker 3028 and/or the microphone 3030.

In one implementation, a pressing of the button for a first duration may disengage a lock of the touch screen 3046; and a pressing of the button for a second duration that is longer than the first duration may turn power to the mobile device on or off. The user may be able to customize a functionality of one or more of the buttons. The touch screen 3046 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™.

The mobile device may, therefore, include a 32-pin connector that is compatible with the iPod™. Other input/output and control devices can also be used.

The memory interface 3002 can be coupled to memory 3050. The memory 3050 can include high-speed random access memory and/or non-volatile memory, such as one or more magnetic disk storage devices, one or more optical storage devices, and/or flash memory (e.g., NAND, NOR). The memory 3050 can store an operating system 3052, such as Darwin, RTXC, LINUX, UNIX, OS X, WINDOWS, or an embedded operating system such as VxWorks. The operating system 3052 may include instructions for handling basic system services and for performing hardware dependent tasks. In some implementations, the operating system 3052 can be a kernel (e.g., UNIX kernel).

The memory 3050 may also store communication instructions 3054 to facilitate communicating with one or more additional devices, one or more computers and/or one or more servers. The memory 3050 may include graphical user interface instructions 3056 to facilitate graphic user interface processing; sensor processing instructions 3058 to facilitate sensor-related processing and functions; phone instructions 3060 to facilitate phone-related processes and functions; electronic messaging instructions 3062 to facilitate electronic-messaging related processes and functions; web browsing instructions 3064 to facilitate web browsing-related processes and functions; media processing instructions 3066 to facilitate media processing-related processes and functions; GPS/Navigation instructions 3068 to facilitate GPS and navigation-related processes and instructions; camera instructions 3070 to facilitate camera-related processes and functions; and/or other software instructions 3072 to facilitate other processes and functions. The memory 3050 may also store other software instructions (not shown), such as web video instructions to facilitate web video-related processes and functions; and/or web shopping instructions to facilitate web shopping-related processes and functions. In some implementations, the media processing instructions 3066 are divided into audio processing instructions and video processing instructions to facilitate audio processing-related processes and functions and video processing-related processes and functions, respectively. An activation record and International Mobile Equipment Identity (IMEI) 3074 or similar hardware identifier can also be stored in memory 3050.

The foregoing description details certain embodiments of the invention. It will be appreciated, however, that no matter how detailed the foregoing appears in text, the invention can be practiced in many ways. For example, the above-described CSS transforms and CSS animations may be performed on other types of objects, in addition to an boxes. For example, images, circles, and other CSS shapes may be analyzed using the described systems. As may be also stated above, it should be noted that the use of particular terminology when describing certain features or aspects of the invention should not be taken to imply that the terminology may be being re-defined herein to be restricted to including any specific characteristics of the features or aspects of the invention with which that terminology may be associated.

All of the methods and processes described above can be embodied in, and fully automated via, software code modules executed by one or more general purpose computers. The code modules can be stored in any type of computer-readable medium or other computer storage device. Some or all of the methods can alternately be embodied in specialized computer hardware.

Although this invention has been described in terms of certain embodiments and applications, other embodiments and applications that are apparent to those of ordinary skill in the art, including embodiments which do not provide all of the features and advantages set forth herein, are also within the scope of the invention. Accordingly, the scope of the present invention is intended to be defined only by reference to the following claims.

The invention claimed is:

1. A method comprising:
   assembling, by a computer, a stylesheet document structure defining a document content, a document presentation, and movement information into an integrated stylesheet data structure, wherein the movement information includes a transform style specifying a keyframe rule specifying one or more transforms, and wherein the keyframe rule includes a keyword, a name of a target transition or a name of a target animation, and a set of style rules;
   transmitting the integrated stylesheet data structure to a device, wherein the document content, the document presentation, and the movement information are accessible by an end user, wherein the integrated stylesheet data is translatable by the device into a visual display of the stylesheet document structure.

2. The method of claim 1 further comprising integrating the integrated stylesheet data structure with a scripting language.

3. The method of claim 1, wherein the integrated stylesheet data structure is at least one of a web application and a web page.

4. The method of claim 1, wherein the stylesheet document structure further defines moving objects and wherein the moving objects are a transformation of one or more moving or non-moving objects using the movement information.

5. The method of claim 4, wherein the transformation is at least one of scale, rotation, translation, skew, matrix transform, perspective, transformation around a user-defined origin, and backside.

6. The method of claim 1, wherein the document content comprises at least one file format including text, image, audio, video and animation.

7. The method of claim 1, wherein if the transform style is a flattening style, translation of the integrated stylesheet data structure comprises flattening at least one child object into a parent object.

8. The method of claim 1, wherein if the transform style is a perspective style, translation of the integrated stylesheet data structure comprises maintaining at least one child object in 3D space.

9. A method comprising:
   receiving, by a device, an integrated stylesheet data structure comprising document content, document presentation, and movement information for moving objects, wherein the movement information includes a transform style specifying a keyframe rule specifying one or more transforms, and wherein the keyframe rule includes a keyword, a name of a target transition or a name of a target animation, and a set of style rules; and
   translating, by the device, the integrated stylesheet data structure into a visual display of a stylesheet document structure, wherein the visual display of the stylesheet document structure includes the moving objects.

10. The method of claim 9, wherein the integrated stylesheet data structure further defines the moving objects and wherein the moving objects are a transformation of one or more moving or non-moving objects using the movement information.

11. The method of claim 10, wherein the transformation is at least one of scale, rotation, translation, skew, matrix transform, perspective, transformation around a user-defined origin, and backside.

12. The method of claim 9, wherein the document content comprises at least one file format including text, image, audio, video and animation.

13. The method of claim 9, wherein if the transform style is a flattening style, translation of the integrated stylesheet data structure comprises flattening at least one child object into a parent object.

14. The method of claim 9, wherein if the transform style is a perspective style, translation of the integrated stylesheet data structure comprises maintaining at least one child object in 3D space.

15. A non-transitory machine readable medium storing executable instructions which when executed by a processor cause the processor to the perform the operations of:
assembling, by a computer, a stylesheet document structure defining a document content, a document presentation, and movement information into an integrated stylesheet data structure, wherein the movement information includes a transform style specifying a keyframe rule specifying one or more transforms, and wherein the keyframe rule includes a keyword, a name of a target transition or a name of a target animation, and a set of style rules;
transmitting the integrated stylesheet data structure to a device, wherein the document content, the document presentation, and the movement information are accessible by an end user, wherein the integrated stylesheet data structure is translatable by the device into a visual display of the stylesheet document structure.

16. The non-transitory machine readable medium of claim 15 further comprising integrating the integrated stylesheet data structure with a scripting language.

17. The non-transitory machine readable medium of claim 15, wherein the integrated stylesheet data structure is at least one of a web application and a web page.

18. The non-transitory machine readable medium of claim 15, wherein the stylesheet document structure further defines moving objects and wherein the moving objects are a transformation of one or more moving or non-moving objects using the movement information.

19. The non-transitory machine readable medium of claim 18, wherein the transformation is at least one of scale, rotation, translation, skew, matrix transform, perspective, transformation around a user-defined origin, and backside.

20. The non-transitory machine readable medium of claim 15, wherein the document content comprises at least one file format including text, image, audio, video and animation.

21. The non-transitory machine readable medium of claim 15, wherein if the transform style is a flattening style, translation of the integrated stylesheet data structure comprises flattening at least one child object into a parent object.

22. The non-transitory machine readable medium of claim 15, wherein if the transform style is a perspective style, translation of the integrated stylesheet data structure comprises maintaining at least one child object in 3D space.

23. A non-transitory machine readable medium storing executable instructions which when executed by a processor cause the processor to the perform the operations of:
receiving, by a device, an integrated stylesheet data structure comprising document content, document presentation, and movement information for moving objects, wherein the movement information includes a transform style specifying a keyframe rule specifying one or more transforms, and wherein the keyframe rule includes a keyword, a name of a target transition or a name of a target animation, and a set of style rules; and
translating, by the device, the integrated stylesheet data structure into a visual display of a stylesheet document structure, wherein the visual display of the stylesheet document structure includes the moving objects.

24. The non-transitory machine readable medium of claim 23, wherein the stylesheet document structure further defines the moving objects and wherein the moving objects are a transformation of one or more moving or non-moving objects using the movement information.

25. The non-transitory machine readable medium of claim 24, wherein the transformation is at least one of scale, rotation, translation, skew, matrix transform, perspective, transformation around a user-defined origin, and backside.

26. The non-transitory machine readable medium of claim 23, wherein the document content comprises at least one file format including text, image, audio, video and animation.

27. The non-transitory machine readable medium of claim 23, wherein if the transform style is a flattening style, translation of the integrated stylesheet data structure comprises flattening at least one child object into a parent object.

28. The non-transitory machine readable medium of claim 23, wherein if the transform style is a perspective style, translation of the integrated stylesheet data structure comprises maintaining at least one child object in 3D space.

* * * * *